(12) United States Patent
Thatte et al.

(10) Patent No.: US 12,147,395 B2
(45) Date of Patent: Nov. 19, 2024

(54) SELF-CORRECTING PIPELINE FLOWS FOR SCHEMA DRIFT

(71) Applicant: Oracle International Corporation, Redwood Shores, CA (US)

(72) Inventors: Sachin Sadashiv Thatte, San Jose, CA (US); Arun Patnaik, Fremont, CA (US); David Allan, Novato, CA (US); Frank Joseph Klein, Eagan, MN (US); Sathish Paul Leo, San Mateo, CA (US); Vikas Varma, Alpharetta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 16/656,372

(22) Filed: Oct. 17, 2019

(65) Prior Publication Data

US 2020/0125540 A1    Apr. 23, 2020

Related U.S. Application Data

(60) Provisional application No. 62/748,368, filed on Oct. 19, 2018.

(51) Int. Cl.
*G06F 16/00* (2019.01)
*G06F 9/54* (2006.01)
*G06F 16/21* (2019.01)
*G06F 16/25* (2019.01)

(52) U.S. Cl.
CPC ............ *G06F 16/211* (2019.01); *G06F 9/544* (2013.01); *G06F 16/258* (2019.01)

(58) Field of Classification Search
None
See application file for complete search history.

(56) References Cited

U.S. PATENT DOCUMENTS

| | | | |
|---|---|---|---|
| 7,565,379 B2* | 7/2009 | Lu | G06F 7/00 |
| 7,613,741 B2* | 11/2009 | Lu | G06F 16/27 |
| 8,005,802 B2* | 8/2011 | Lu | G06F 16/27 |
| | | | 707/999.102 |
| 9,317,470 B1* | 4/2016 | Raley | H04L 67/568 |
| 9,396,037 B2* | 7/2016 | Morsi | G06F 9/5083 |
| 9,396,156 B2* | 7/2016 | Barrall | G06F 15/167 |

(Continued)

*Primary Examiner* — Farhan M Syed
(74) *Attorney, Agent, or Firm* — Kilpatrick Townsend & Stockton LLP

(57) ABSTRACT

Techniques describes herein updating pipeline flows in within data systems to maintain data integrity and consistency without manual curation. In certain embodiments, data integration system may detect and/or receive indications of a schema change within a source system of the data integration system. One or more data objects affected by the schema change may be identified, and a set of pipeline rules may be invoked for each of the affected schema changes. The pipeline rules may define a single transformation or a multi-step transformation process by which the data in the source system is provided to one or more target systems. After applying the pipeline rules to the updated source schema, the data received from the source system may be processed using the updated pipeline rules, transformed, and transmitted to the target system(s) to maintain the data integrity of the system.

18 Claims, 17 Drawing Sheets

(56) References Cited

U.S. PATENT DOCUMENTS

| | | | | |
|---|---|---|---|---|
| 10,255,336 | B2* | 4/2019 | Waas | G06F 16/252 |
| 11,036,408 | B2* | 6/2021 | Monday | G06F 3/0653 |
| 2004/0030707 | A1* | 2/2004 | Lu | G06F 16/27 |
| 2004/0034618 | A1* | 2/2004 | Lu | G06F 16/27 |
| 2004/0034619 | A1* | 2/2004 | Lu | G06F 11/2097 |
| 2013/0227573 | A1* | 8/2013 | Morsi | G06F 9/5083 |
| | | | | 718/100 |
| 2013/0290464 | A1* | 10/2013 | Barrall | G06F 15/167 |
| | | | | 709/213 |
| 2014/0208063 | A1* | 7/2014 | Ruggiero | G06F 16/22 |
| | | | | 711/206 |
| 2016/0034501 | A1* | 2/2016 | Horner | G06V 30/416 |
| | | | | 707/804 |
| 2016/0328442 | A1* | 11/2016 | Waas | G06F 16/252 |
| 2018/0275902 | A1* | 9/2018 | Monday | G06F 3/0632 |
| 2018/0329916 | A1* | 11/2018 | Waas | G06F 16/252 |
| 2019/0303379 | A1* | 10/2019 | Waas | G06F 16/252 |

* cited by examiner

Data Integration Platform Cloud Service — Welcome!

Instances   Activity   SSH Access

Summary — As of Dec 8, 2017 5:04:37 PM UTC

| 2 Instances | 2 OCPUs | 30 GB Memory | 874 GB Storage | 2 Public IPs |

Create Instance — 204

Instances

[Search by instance name]

DIPCDEF
Version: 18.1.3    Created On: Dec 8, 2017 12:37:24 PM UTC
OCPUs: 1
Memory: 15 GB
Storage: 437 GB

DIPCGHI
Version: 17.4.5    Created On: Dec 8, 2017 9:36:22 AM UTC
ⓘ One or more patch(es) available
OCPUs: 1
Memory: 15 GB
Storage: 437 GB

Properties: EnrichData

Details  Attributes

Show [Joiner_In1 ▼]   Showing Fields: 223 of 223

Fields

Rules
NamePatternRule   INCLUDE   *

FIG. 7A

Properties: EnrichData

Details  Attributes

Show [Joiner_In1 ▼]   Showing Fields: 220 of 223

Fields

Rules
NamePatternRule   INCLUDE   *
NamePatternRule   EXCLUDE   *_DESCRIPTION

FIG. 7B

Properties: EnrichData

Details  Attributes

Show [Joiner_In1 ▼]   Showing Fields: 220 of 223

Fields

Rules
NamePatternRule   INCLUDE   *
NamePatternRule   EXCLUDE   LowValueFields

FIG. 7C

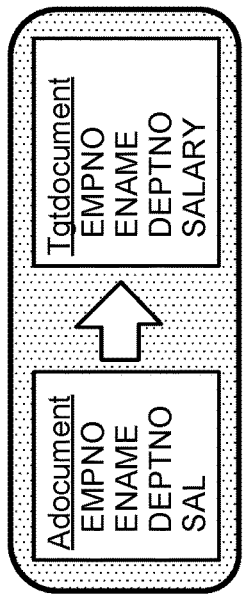
FIG. 10A
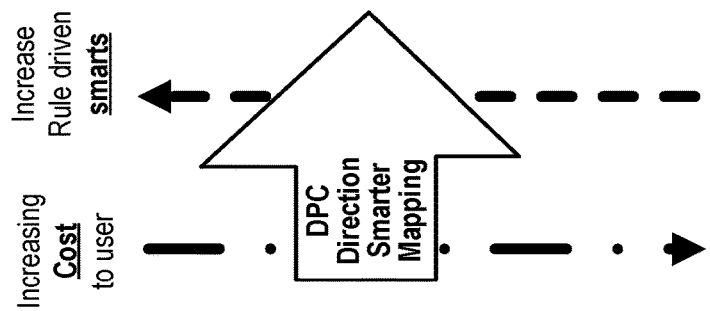
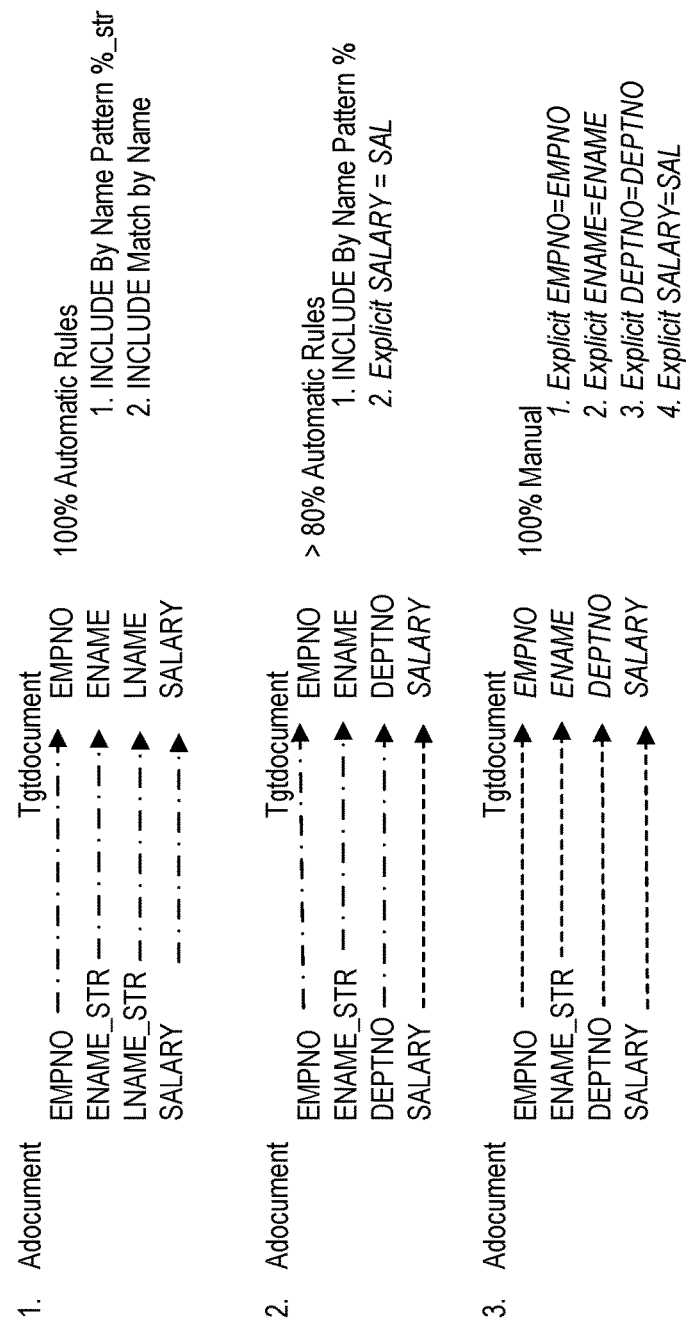
FIG. 10B

SELF-CORRECTING PIPELINE FLOWS FOR SCHEMA DRIFT

CROSS-REFERENCE TO RELATED APPLICATIONS

This application is a non-provisional of and claims the benefit of and priority to U.S. Provisional Patent Application No. 62/748,368, filed Oct. 19, 2018, and entitled "SELF-CORRECTING PIPELINE FLOWS FOR SCHEMA DRIFT," the entire contents of which is incorporated herein by reference for all purposes.

BACKGROUND

For large-scale applications and data storage systems, the variety and velocity of data changes makes these applications/systems difficult or impossible to manage by humans alone, often requiring assistance from smart tooling and other technologies. However, even with such tooling and other automated systems, significant technique challenges remain in keeping data integration systems in sync during the frequent and continuous changes, both to the data itself and to structure/organization of the data as defined by a database schema.

Conventional systems that involve data transfers, database replication, syncing, mirroring, and/or other data integration tasks, present significant challenges for maintaining data integrity across the multiple connected systems. For example, conventional cloud-scale tools often offer little or no maintainability help, but instead require high levels of maintenance and human curation. Traditionally specialized domain model experts may purely human curate integrations, where such human curation includes defining how models are mapped via attribute level mapping, joins, look-ups, filters in a flow, etc. These curation processes may need to be performed repeatedly, and the human-defined data pipelines are rarely reused.

The present disclosure addresses these challenges by using data pipeline flows that may be defined such that maintenance of the flows is kept to minimum as the database schemas change (e.g., drift or evolve). The techniques described herein generally apply to rapid development of applications in a cloud-scale ecosystem (or other large-scale distributed data system), where the data and data models may grow rapidly. More specifically, the techniques described herein relate to performing changes within the data pipelines, in order to keep data integration systems in sync, allowing the business to work efficiently. Certain techniques described herein involve the combination of rules and artificial-intelligence components, to provide a unique combination that empowers users to do much more. Integration interactions such as attribute level mapping may be captured via rules which may or may not be powered by recommendations.

BRIEF SUMMARY

Accordingly, aspects of the present disclosure relate to techniques (e.g., methods, systems, devices, computer-readable media storing computer-executable instructions used to perform computing functions, etc.) for automatically adjusting the pipeline flows in a data system, to maintain data integrity and consistency without manual curation. For example, in certain embodiments described herein, a data integration system may detect and/or receive indications of a schema change at a source within the data integration system. The particular objects affected by the schema change (e.g., tables, fields, data types) are identified, and a set of pipeline rules may be invoked for each of the affected schema changes. The pipeline rules may define a single transformation or a multi-step transformation process by which the data in the source system is provided to one or more target systems. After applying the pipeline rules to the updated source schema, the data within the source schema may be processed using the updated pipeline rules, transformed, and transmitted to the target system(s) to maintain the data integrity of the system.

Certain embodiments described herein include techniques for transforming data within a data pipeline comprising one or more data processing nodes. In some embodiments, a processing node within a data pipeline may receive a first data set from a source system. The processing node then may determine a database schema of the source system associated with the received data set, and retrieve one or more pipeline flow rules associated with the data pipeline. The processing node then may determine a set of data transformation rules based on the source database schema, using the retrieved pipeline flow rules, and transform the received data set into a transformed data set using the data transformation rules. Finally, the transformed data set may be transmitted to one or more target systems.

BRIEF DESCRIPTION OF THE DRAWINGS

A further understanding of the nature and advantages of embodiments according to the present disclosure may be realized by reference to the remaining portions of the specification in conjunction with the following appended figures.

FIG. 2 is an example screen of a customized dashboard in a user interface used to configure, monitor, and control a service instance, in accordance with certain embodiments of the present disclosure.

FIGS. 7A-7C are example screens of a user interface showing the status of pipeline flow rules for different fields at multiple different times, in accordance with certain embodiments of the present disclosure.

FIGS. 10A and 10B show three example sets of field mapping rules that may be executed via an autonomous data pipeline to perform an illustrative table-field mapping transformation, in accordance with certain embodiments of the present disclosure.

Figure 1:
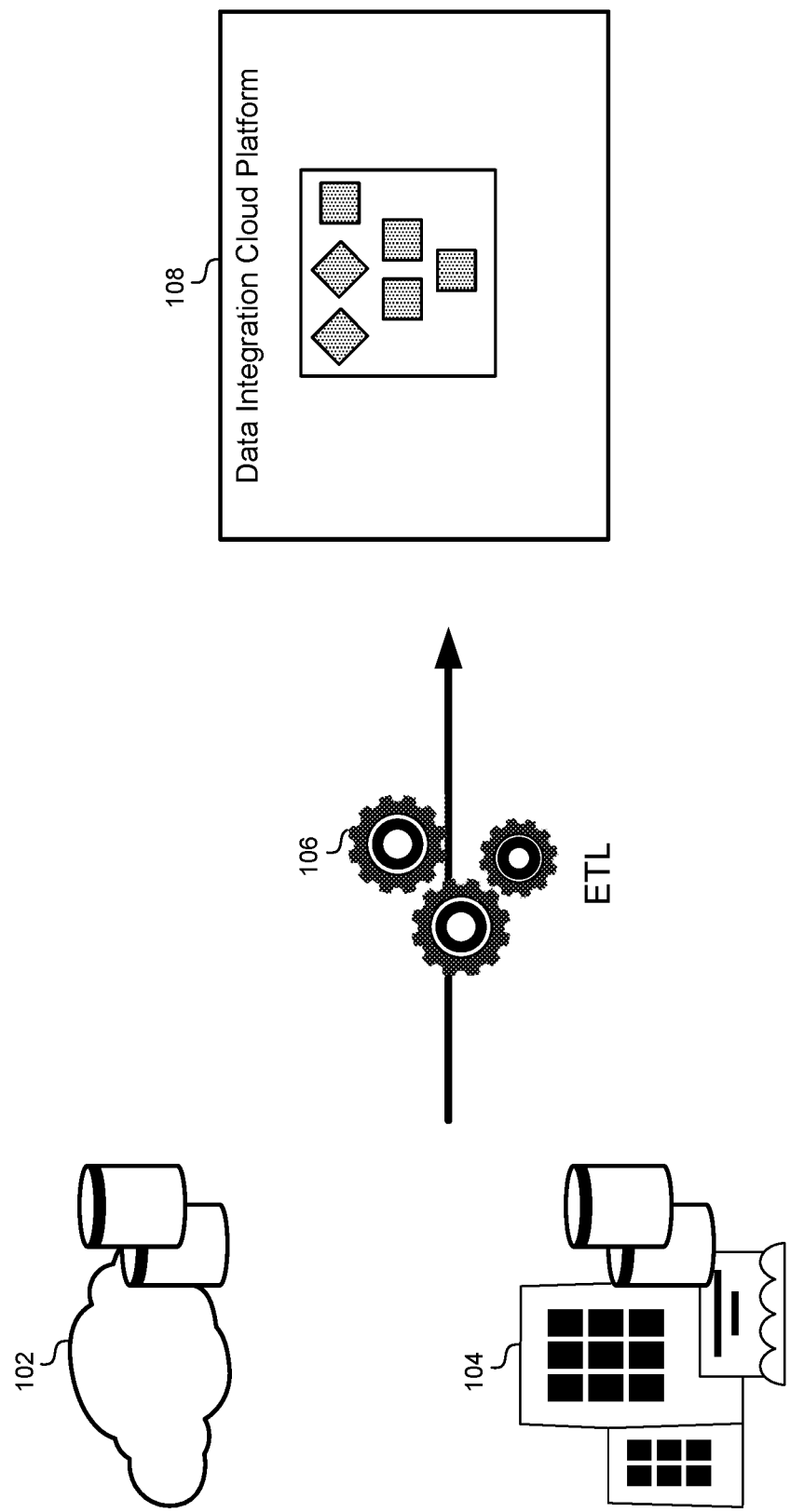
FIG. 1 is a diagram of an example computer system architecture including a data integration cloud platform in which certain embodiments of the present disclosure may be implemented.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

Certain embodiments described herein may be implemented as part of a Data Integration Platform Cloud (DIPC). In general, data integration involves combining data residing in different data sources and providing users with unified access and a unified view of the data. This process often arises and becomes significant in many situations, such as merging commercial entities with existing legacy databases. Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIPC to combine many heterogeneous data sources such that they can be presented in a unified view to the user.

The DIPC is a cloud-based platform for data transformation, integration, replication, and governance. It provides batch and real-time data movement between cloud and on-premises data sources while maintaining data consistency with default-tolerance and resiliency. The DIPC may be used to connect to various data sources and prepare, transform, replicate, govern, and/or monitored data from these various sources as they are combined into one or more data warehouses. The DIPC can work with any type of data source and support any type of data in any format. The DIPC can use a Platform as a Service (PaaS) or Infrastructure as a Service (IaaS) architecture to provide cloud-based data integration for an Enterprise.

The DIPC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery that maintains availability.

FIG. 1 illustrates a computer system architecture that utilizes the DIPC to integrate data from various existing platforms, according to some embodiments. A first data source 102 may include a cloud-based storage repository. A second data source 104 may include an on-premises data center. In order to provide uniform access and views to the first data source 102 and the second data source 104, the DIPC 108 can use an existing library of high-performance ELT functions 106 to copy data from the first data source 102 and the second data source 104. The DIPC 108 can also extract, enrich, and transform the data as it is stored in a new cloud platform. The DIPC 108 can then provide access to any big data utilities that are resident in or accessible by the cloud platform. In some embodiments, the original data sources 102 and 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

FIG. 2 illustrates one of the customized dashboards in a user interface that can be used to configure, monitor, and control a service instance in the DIPC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIPC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
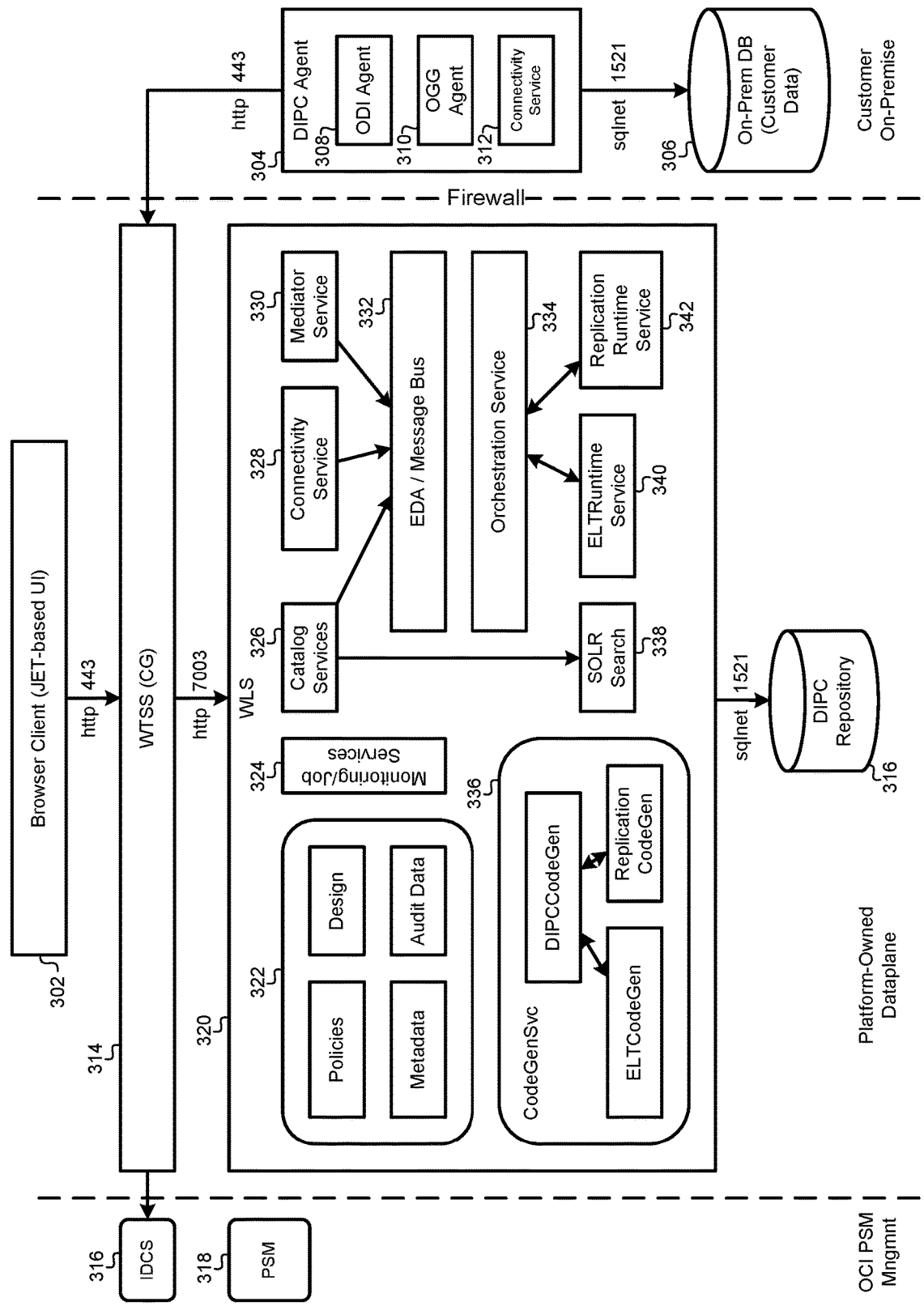
FIG. 3 is an architectural diagram of a data integration cloud platform, in accordance with certain embodiments of the present disclosure.

FIG. 3 illustrates an architectural diagram of the DIPC, according to some embodiments. Requests may be received through a browser client 302, which may be implemented using a JavaScript Extension Toolkit (JET) set of components. Alternatively or additionally, the system may receive requests through a DIPC agent 304 that operates at a customer's on-premises data center 306. The DIPC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIPC.

Incoming requests can be passed through a sign-in service 314, which may include load-balancing or other utilities for routing requests through the DIPC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIPC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIPC can be implemented on a Web logic server 320 for building and deploying enterprise applications in the cloud environment. The DIPC may include a local repository 322 that stores data policies, design information, metadata, and audit data for information passing through the DIPC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIPC. Information within the DIPC may be passed using an Event Driven Architecture (EDA) and a corresponding message bus 332.

The DIPC may also include an orchestration service 334. The orchestration service 334 may enable automation tasks by calling REST endpoints, scripts, third-party automation frameworks, and so forth. These tasks can then be executed by the orchestration service 334 to provide the DIPC functionality. The orchestration service 334 can use run-time services to import, transform, and store data. For example, an ELT runtime service 334 can execute the library of ELT functions described above, while the replication runtime service 342 can copy data from various data sources into a cloud-deployed DIPC repository 316. Additionally, the DIPC may include a code generation service 336 that provides automatic code generation for both ELT functions and replication functions.

As noted above, data integration processes become increasingly complex and resource-consuming processes as data systems become larger and as data schema drift and evolution become more common. For example, conventional cloud-scale tools often require high levels of manual maintenance and/or human curation. Traditionally specialized domain model experts may curate integrations manually, including defining how models are mapped via attribute level mapping, joins, lookups, filters in a flow, etc. Such curation processes are often performed repeatedly in response to schema changes, and human-defined data pipelines often are not or cannot be reused.

Therefore, certain aspects described herein relate to using pipeline rules to automatically adjust the pipeline flows in a data system, thereby maintaining data integrity and consistency across the system. In certain embodiments, a data integration system may detect and/or receive indications of a schema change at a source within the data integration system. The particular objects affected by the schema change (e.g., tables, fields, data types) are identified, and a set of pipeline rules may be invoked for each of the affected schema changes. The pipeline rules may define a single transformation or a multi-step transformation process by which the data in the source system is provided to one or more target systems. After applying the pipeline projection rules to the updated source schema, the data within the source schema may be processed using the updated pipeline rules, transformed, and transmitted to the target system(s) to maintain the data integrity of the system.

Figure 4:
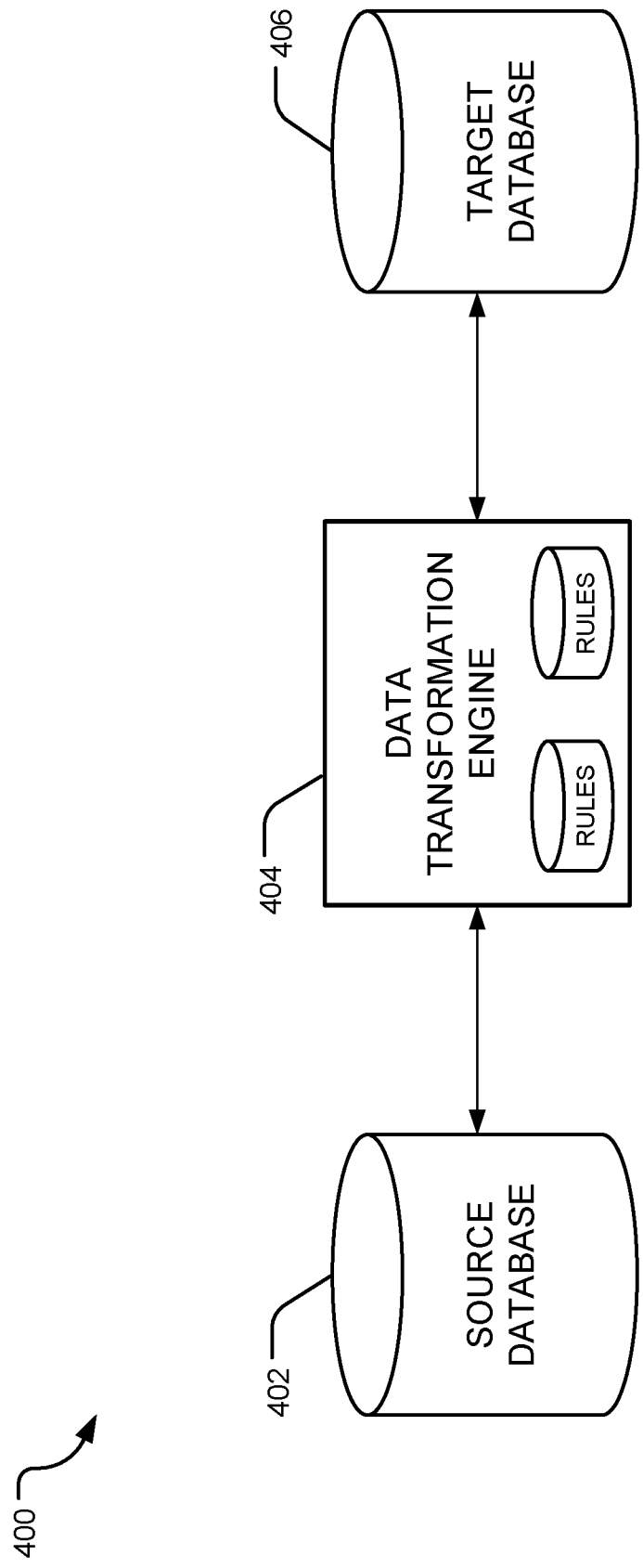
FIG. 4 shows an example data pipeline, in accordance with certain embodiments of the present disclosure.

With reference now to FIG. 4, a block diagram is shown illustrating a simplified example of a data pipeline 400. As may be apparent through the following descriptions of examples and embodiments, a data pipeline may refer to a conceptual manifestation and potentially (but not necessarily) a physical manifestation. As described herein, performing data processing via a pipeline model may provide technical advantages, including dividing the integration problem into smaller operators which may be combined together to form the data pipeline. In this example, data pipeline 400 may include one or more interconnected storage systems 402 and 406, as well as a data transformation engine 404 configured to implement a set of transformation rules that map the data from the source system 402 to one or more target systems 406. Pipeline 400 may correspond to or be part of a cloud-based computing ecosystem, or other large-scale distributed data computing system/application, in which data consistency or integrity is maintained between the source and target systems.

Figure 5:
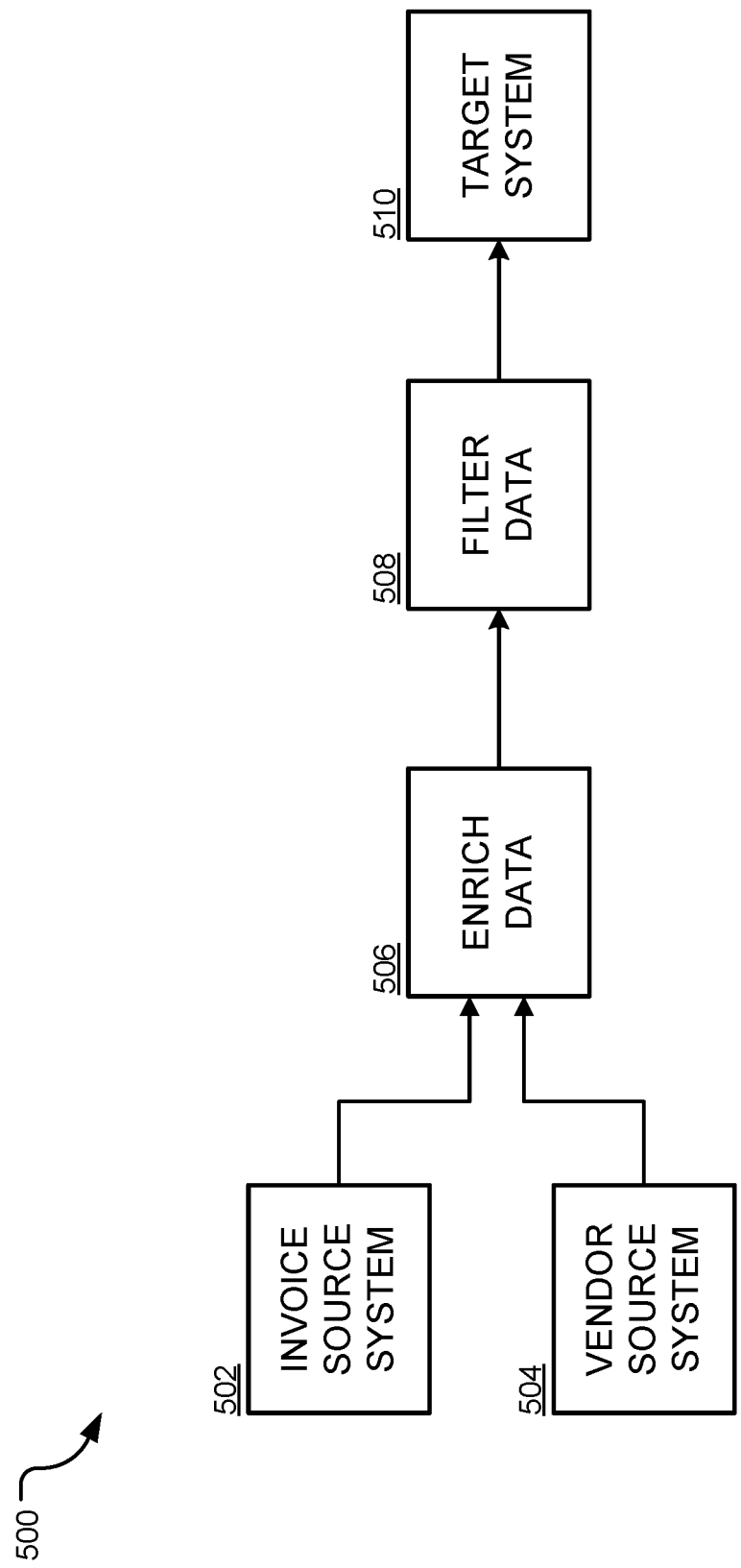
FIG. 5 shows another example data pipeline, in accordance with certain embodiments of the present disclosure.

Referring now to FIG. 5, another example data pipeline 500 is shown. In this example, the figure represents the design for the pipeline, and in this example data from multiple source systems, an invoice source system 502 and a vendor source system 504. Data pipeline 500 includes a data enrichment component 506, and a filter 508 configured to retrieve, transform, and map the data from source systems 502 and 504 to a single target system 510. Further, in some embodiments, certain source systems (e.g., invoice system 502) may provide information via a stable application system, while other source systems (e.g., vendor system 504) may provide information via REST APIs and/or via files and may change often. Additionally, such embodiments illustrate further technical advantages. For example, significant additional computing resources and costs would be required, if the design of such a data pipeline 500 had to be manually modify every time a new attribute was added to the model of an input system (e.g., vendor source system 504).

In these examples, for data pipelines (e.g., 400, 500), and other data pipelines described herein, each data pipeline may include a series of semantic actions integrating data entities. These data entities may be batch, stream, API's, etc. As data passes through the pipeline from a source system 402 to a target system 406, the data may be processed using a sequence of semantic actions. These actions may vary from actions to ingest data, to transform the data, to integrate and publish the data to one or more target systems 406.

As described herein, a pipeline flow may refer to the computing infrastructure and features that allow users to specify, define, and manage how data from various source systems may flow through one or more transformations to be written to a target system. In some embodiments (e.g., as shown in FIG. 5), a pipeline object 500 may include multiple different nodes (e.g., the enrich data node 506 and filter data node 508), where each node performs a separate data transformation, and where the nodes are connected via communication links. Such systems may be generated be and represented to the user graphically via a graphical user interface, in which the pipeline is represented as a directed acyclic graph made of graphical node objects and connected by links representing the flow of data between nodes. In such embodiments, pipeline flow features may provide out-of-the box transformations such as Filter, Joiner, Expression and Aggregator. These transformations may provide functionality to manipulate data that is read from one or more different source systems, before being written to one or more target systems. As discussed in more detail below, pipeline flows may be designed and implemented using pipeline rules, as opposed to conventional systems that require explicit data mapping rules and/or individual attribute information. The examples discussed in more detail below may illustrate the difference between explicit data mapping rules and pipeline rules. For example, in FIG. 10B, the examples of explicit data mapping rules may correspond to the five rules labeled "Explicit" (e.g., "SAL→SALARY"), whereas example of pipeline rules include but are not limited to the "INCLUDE By Name Pattern %_str," "INCLUDE Match by Name," and "INCLUDE By Name Pattern %." In these and other examples, explicit data mapping rules may be driven by specific attribute names, whereas pipeline rules may be based on attribute name patterns, attribute data types, and combinations of various properties associated with the models.

Figure 6:
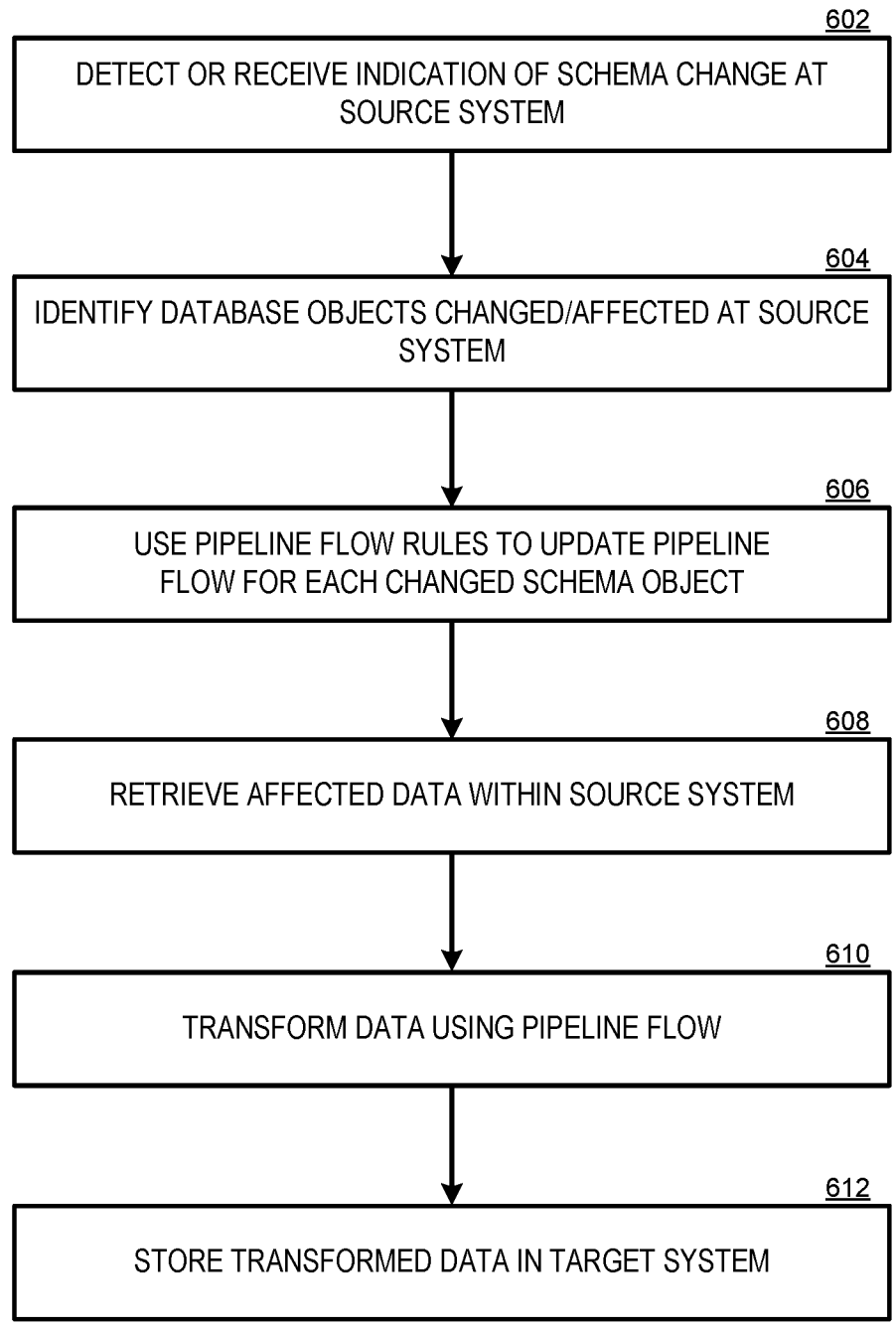
FIG. 6 is a flowchart illustrating a process of updating a set of pipeline rules controlling a pipeline flow, in accordance with certain embodiments of the present disclosure.

Referring now to FIG. 6, a flowchart is shown illustrating a process of updating a set of pipeline rules controlling a pipeline flow, in response a schema change within a source system (e.g., 402 or 502-504). The steps in this process may be performed by one or more components in system 400 and/or components not shown but discussed in more detail below, including a rules engine, pipeline nodes and other pipeline components, and/or other components within the computing architecture of a cloud-based or other large-scale application.

In step 602, a schema change occurs within one or more source systems (e.g., 402) associated with a data pipeline. As noted above, the schema of the source system refers to the structure and organization of the data within the source system 402, rather than to individual data value or the like. Thus, schema changes detected/identified in step 602 may include, for example, the creation, deletion, alteration, and/or renaming of tables, views, indexes, procedures, queues, triggers, or other database objects. Other examples of schema changes may include changing the data type of a column, changing a relationship defined between different data tables/columns/etc. within the source system 402, etc. In some embodiments, the schema change may be detected automatically by a pipeline node, rules engine, or other components associated with a data pipeline. For example, any of the nodes within a data pipeline 400, including the source systems, target systems, and/or any intermediary node, may receive data that originated at the source system and analyze the characteristics of the data (e.g., number of fields, types/names of fields, data types and sizes of data, etc.) to determine that schema changes have occurred within the source system(s). For example, an intermediary node (data transformation engine 406) may compare the characteristics of a first data transmission through the pipeline (e.g., the number of fields transmitted, the data types of the fields, the sizes of the data fields, etc.), to detect that a schema change has occurred within the source server 402. In some embodiments, changes to the characteristics of the data may be detected explicitly by retrieving model information (when needed) and comparing with a prior snapshot. Additionally, rule-based transformations may allow the system to adjust to model changes without causing disruptions. Additionally or alternatively, one or more components with the pipeline flow may receive an indication of the schema change from the source database server 402, target database server 406, and/or another third-party component.

In step 604, the set of database objects affected by the schema change from step 602 may be identified. In some embodiments, the database objects affected may simply be the same objects that were changed in step 602, for instance, one or more tables, views, columns, triggers, indexes, or other objects that were modified, added, or deleted within the source server 402. However, in other cases, the database objects identified in step 604 may include other database objects that were not directly added/deleted/modified within the source server 302, but instead were indirectly affected by the schema change. For example, certain schema changes within the source database 402 might impact the pipeline rules for additional objects within the source database 402, so that the additional objects may be indirectly affected. For instance, the addition, removal, or modification of a field, column, trigger, or other database object may affect the execution of pipeline rules that apply to the table containing the objects that were directly affected, and thus may indirectly affect one or more additional objects, such as other columns, tables, views, or indexes logically linked to the affected objects. Similarly, the removal or modification of a table may indirectly affect the execution of pipeline rules that apply to columns within the table, or to other tables based on relationships defined between the tables, and so on.

In step 606, a set of pipeline flow rules is invoked based on the schema changed within the source system detected in step 602. As noted above, a rule in a pipeline flow may be an artifact created by the user that captures enough data so that the system itself (and not the user) is capable of handling schema changes. In other words, the pipeline flow rules within a data pipeline may be used to determine the specific data transformation rules that will be used to transform the data sets received from the source system during a transfer to the target system(s). One example of pipeline flow rules may include rules that replicate all columns of a particular data type from the source system to the target system, while all columns of a different particular data type are excluded from (e.g., not replicated to) the target system. Other examples of pipeline flow rules may include similar rules which may be implemented based on criteria include object names, object sizes, and/or structure types, etc., where any of these criteria (or combinations of criteria) may determine if or how the data stored within the source servers 402 is transmitted to the target servers 406. For example, certain pipeline flow rules may cause the processing nodes (e.g., 404) of the data pipeline to implement data transformation rules which replicate a set of all objects (e.g., columns, fields, tables, indexes, etc.) matching particular naming pattern from the source system to the target system, while all objects not matching the naming pattern are excluded from the target system. In other examples, pipeline flow rules may replicate a set objects (e.g., columns, fields, tables, indexes, etc.) within a particular size range (e.g., number of columns, number of rows, and/or overall object size in KB or MB, etc.), while all objects not within the size range are excluded from the target system. In various other examples, different types of pipeline flow rules and/or combinations of multiple rules and/or criteria may be used to specify the flow of data (e.g., the specific data transformation rules) between the source system(s) and target system(s). For instance, additional examples of pipeline flow rules supported by the data pipeline components may include rules which rename table names, field names, and/or other object names from the source system, to different names on the target system, when the source data object satisfy the various criteria. Still further examples of pipeline flow rules that may be supported in some embodiments include rules that replicate or do not replicate one or more specific rows or data fields, based on the data size, data type, or pattern of data within the data field.

Additional examples of pipeline flow rules are described in more detail below, along with different features of how pipeline flow rules may be designed and stored (e.g., via user interfaces and/or backend systems), ordered and executed (e.g., within separate pipeline nodes), and used to shape and map autonomous data transformations between source and target systems.

Thus, in contrast to conventional systems that may allow explicit mapping rules for data transformations, pipeline flow rules have the unique ability to process the rules and provide visual feedback about the effects of such rules on data. For example, as a user is building the data pipelines and adding transformation rules, the effects of applying these rules may be immediately visible to the user in a data grid view.

In some embodiments, the processing of pipeline flow rules may be performed using a software component (e.g., JavaScript) executing with a web browser. In such cases, the browser software may be made up of two components: a FieldsProcessor and a RulesProcessor. These two components may combine to provide an improved user experience while designing pipeline flows. The FieldsProcessor component may be responsible for computing the list of fields that flow in and out of the nodes in the pipeline, and the RulesProcessor component may be responsible for filtering out the list of fields that match a set of rules provided by the user. The RulesProcessor component may use a combination of binary trees and hash-based data structures to efficiently compute the result of rules as data flows through the nodes in the pipeline.

In steps 608-612, data may be accessed and retrieved from the source system(s), transformed and mapped in accordance with the updated pipeline flow, and stored at the target system. As described in the further examples below, steps 608-612 may be performed autonomously by the data pipeline components, and may reflect the changes in the pipeline flow that was updated in step 606. In some embodiments, after updating a pipeline flow in step 606 based on a schema change, steps 608-612 may be initiated automatically for all of the underlying data within the source systems potentially affected by the updated pipeline flow rules. For instance, if a pipeline flow rule affecting a table was modified in step 606, then steps 608-612 may be automatically initiated for that table (even if no data within that table has been changed), so that the desired data integrity may be maintained within the target system. Additionally, whenever new data is added to, removed from, or modified in the relevant data structures of the source systems, steps 608-612 also may be performed to transform the updated data to the target systems in accordance with the normal operation of the data pipeline.

As noted above, in some embodiments, data pipelines consisting of multiple intermediary nodes (e.g., pipeline 500) may provide additional technical advantages over traditional data transformation tools with respect to the shaping and mapping of data between source and target systems. For example, one potential technical advantage in some embodiments is that the semantics of the transformations captured by the user's gestures may be captured and processed via rules, such that they are not only a more productive but reduce subsequent maintenance as well, making the pipelines more resilient to change and reusable. The rules within a data pipeline may embody many different types of rules capable of shaping the mappings between data at the target system(s) and data at the source system(s). Examples of such rules include, for example, exclusion and inclusion rules used to shape the data replicated between source and target systems. Other examples of rules that may be used in various embodiments may include explicit field-to-field mapping rules, type-to-type mapping rules, and/or matching rules by name, datatypes, patterns, etc., when performing data mappings. Within data pipelines, data replications and/or transformations may be applied on sets of fields based on any of the pattern and/or combinations of patterns, for all types transformations including simple scalar transformations and/or aggregations or complex transformations.

In various examples to illustrate data shaping techniques that may be implemented with the data pipelines and data pipeline rules described herein, the starting point of a data pipeline (e.g., 400 or 500) that transforms input data of shape INSHAPE into output data of shape OUTSHAPE. The data pipeline may process the data, including filtering, joining, and/or aggregating as specified by the data pipeline rules, to transform the data. Additionally, a single data pipeline may process data that satisfies the base input shape type (or shape types) during the processing/replication, thereby potentially producing multiple different output data shapes on execution. An execution of a data pipeline at time T may process shape INSHAPE1 and produce OUTSHAPE1, but then at time T_1 the data processed may be INSHAPE1_1 which produces OUTSHAPE1_1, and at a time T_2 the data processed may be INSHAPE1_2 and producing OUTSHAPE1_2, and so on.

With respect to re-shaping data, embodiments in which a data pipeline includes multiple nodes also may be advantageous to facilitate more flexible and robust shape changing. For instance, referring to the user interface screens in FIG. 7A-7C, these figures illustrate an example in which all fields are passed through, so for each of multiple different times (e.g., T, T_1, or T_2) the pipeline flow rules determine the shape processed. Pipeline flow rules may define patterns such as those based on names and datatypes. In various examples, the data being transformed may be analyzed by the system (e.g., by the data transformation engine 404) during the transformation process, so the engine 404 may obtain an understanding of what the information is, what semantic type the data is (e.g., is it sensitive information, is it valuable information, is it noise, etc.). Such semantic analyses may further allows the transformation engine 404 to provide the most likely and/or valuable options to allow users to create and modify pipeline flow rules based on the semantic characteristics of the data (e.g., security level, type of subject-matter, value of information, etc.). Additionally, the pipeline system may apply defaults to focus the user on the most valuable information, whereby rules are used to eliminated noise and/or low-value data fields.

Figure 8:
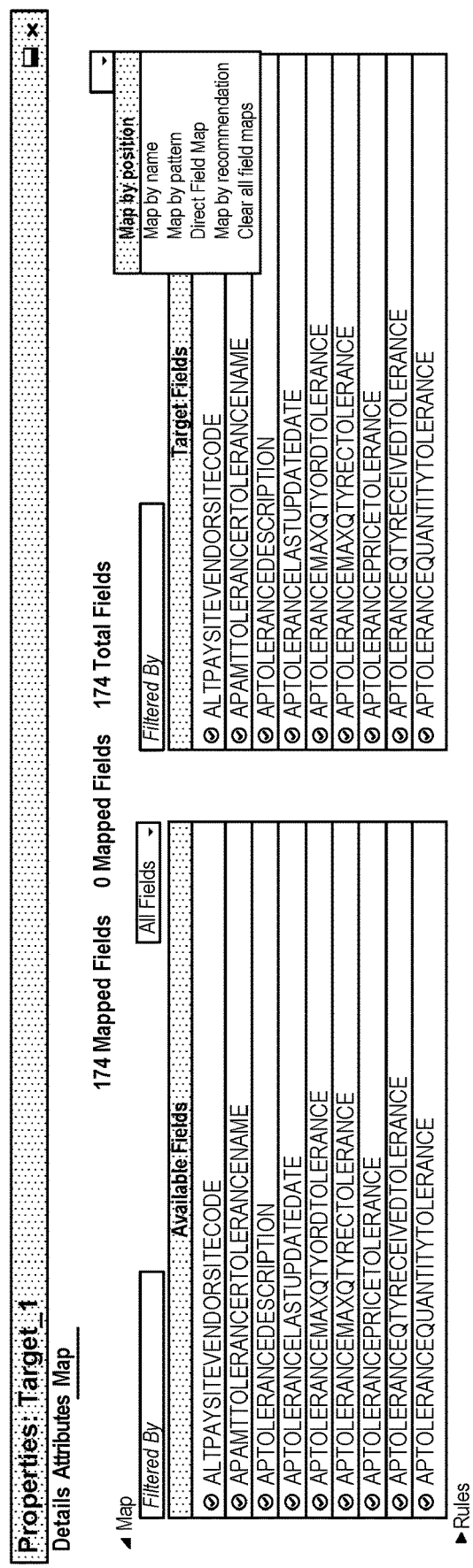
FIG. 8 is an example screen of a user interface demonstrating the mapping of a source shape to a target shape, in accordance with certain embodiments of the present disclosure.

As noted above, pipeline flow rules also may be designed and used to map data from a particular input shape to a desired output shape. These mapping rules allow the system handle schema drift and evolution occurring within the source system(s). Although mapping may still be done point-to-point with explicit rules, additional rules may be supported that map sets of attributes from one shape to another. For example, certain mapping rules may map by data object name, by patterns, by position, and/or by recommendation. Referring now to FIG. 8, an example user interface is shown demonstrating the mapping of a source shape to a target shape, with various options for mapping by manually defining mappings rules and recommended rules. Thus, this figure provides an example of reshaping data, by defining rules for transformation to change a set of source shapes into one or more target shapes.

As illustrated by the above examples, the data pipeline(s) within a cloud-based ecosystem or other large-scale application may correspond to the functionality to design data integrations between arbitrary sources and execute in a polyglot runtime. In some embodiments, data pipeline systems may provide the ability to define data pipelines for accessing arbitrary sources and operate the pipelines, individually and/or en masse. Additionally, data pipelines may transform the data into data ready for consumption at target systems, using an extensible set of operators, including the ability to integrate the data into systems such as cloud-based warehouses, and object storage systems (in append and merge modes). The pipeline flow design, whether received/determined manually, automatically, and/or using a combination of manual and automated processes, may be captured via rules to make the design extensible and capable of handling schema changes, drifts, and evolutions. Finally, in some embodiments, the data pipeline may be executed on a polyglot runtime, providing the additional technical advantages of pushing down to improve leveraging of computing resources and scalability.

Using the data pipelines described herein, cloud-based systems and other data systems may perform data integration tasks between source and target systems, in conjunction with functionality to design, orchestrate, and monitor the data integration. Such functionality may include the abilities to configure existing templates to perform common data integration activities, configure the data pipelines to perform arbitrary data integrations, schedule and data integration tasks, and/or monitor the data integration tasks. The principles controlling the design and implementation of the data integration system/data pipeline may include, for example: (1) providing an intelligent user experience (e.g., where user gestures may be captured as flexible pipeline flow rules); (2) providing a scalable user interface for handling large designs for shapes and data transformations; (3) providing an extensible and evolving system with respect to sources and targets (e.g., extensible handling of complex types for big data scenarios), transformation operators, and code generation systems; and (4) providing support for schema on read, and support for schema drift.

Figure 9A:
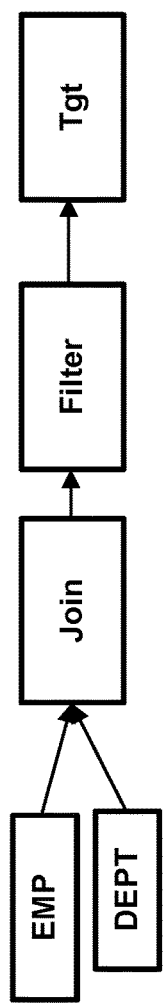
FIGS. 9A and 9B illustrate an example data pipeline design and corresponding set of executions over time, in accordance with certain embodiments of the present disclosure.
Figure 9B:
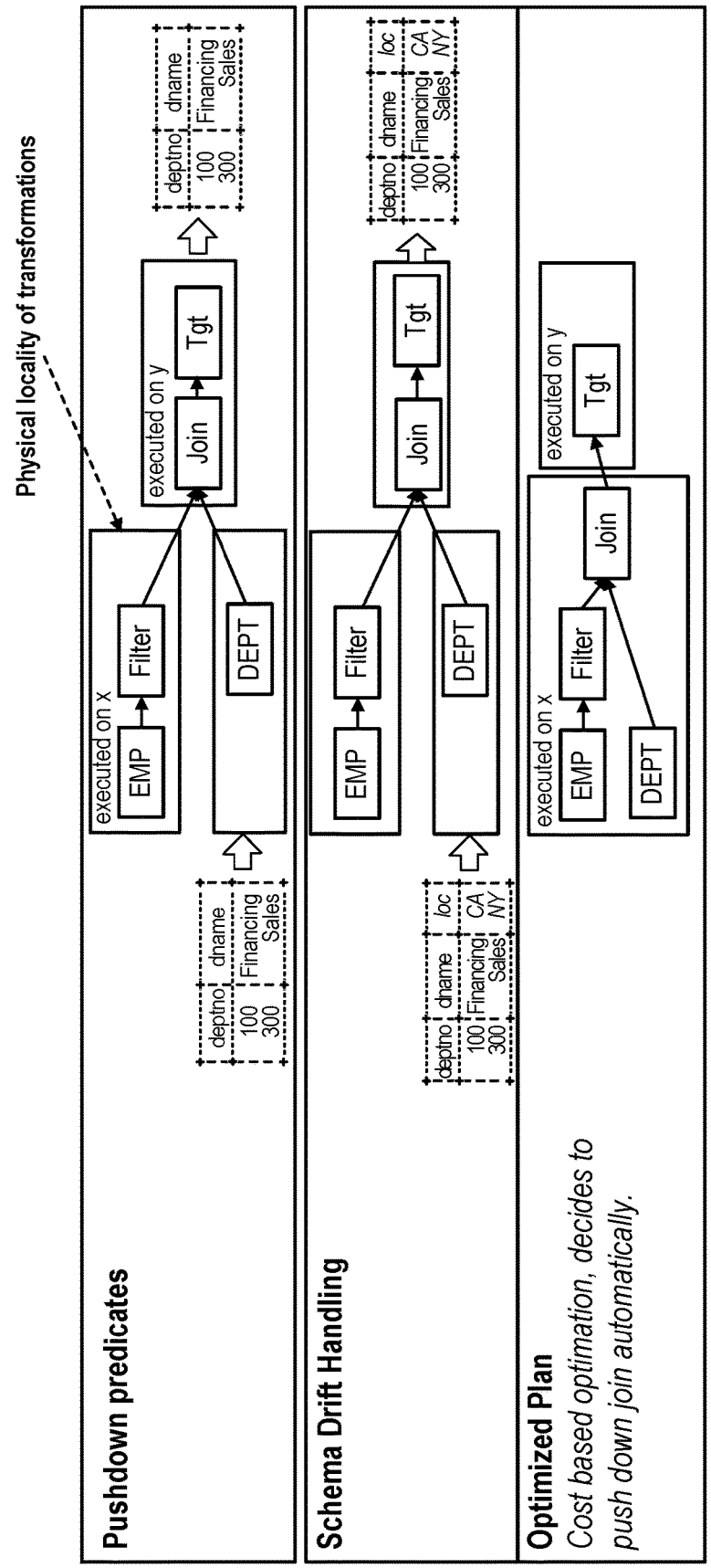

In certain embodiments, the data pipeline may operate partially or entirely autonomously with respect to modifying the pipeline flow in response to schema changes within a source system. Certain data pipelines may provide automatic and manual options for handling schema changes. Additionally, in some cases, data pipelines may be configured to automatically optimize execution plans for optimal automatic data pipelining, for example, by pushing predicates and/or joins to systems. Data pipelines also may leverage autonomous dataflow services. An illustrative example of the operation of an autonomous pipeline is shown in FIGS. 9A and 9B. In this example, FIG. 9A illustrates a data pipeline design, while FIG. 9B illustrates a set of executions over time. Specifically, FIG. 9B illustrates different capabilities in the system, from optimizing physical deployment plans, to handling schema drift changes to optimization of deployment based on cost (which may change over time). Additionally, FIGS. 10A and 10B illustrate three different sets of field mapping rules (all automatic, automatic and manual, all manual) that may be executed via an autonomous data pipeline to perform the table-field mapping transformation shown in FIG. 10A.

In further examples, data pipelines and data integration systems may support embodiments for pipeline configuration, reuse, and/or pipeline templates that can be copied and instantiated with different parameters. In some cases, the configurable pipeline parameters may correspond to connections to source systems (e.g., parameters indicating which of multiple source systems from which data is to be loaded) and/or connections to target systems (e.g., parameters indicating which of multiple target systems into which data is to be loaded). Additionally, parameters may be literals (e.g., filter orders where status has a particular value rather than other values), and/or entities/attributes (e.g., supporting common patterns to allow users to specify which attributes have which meaning).

Figure 11:
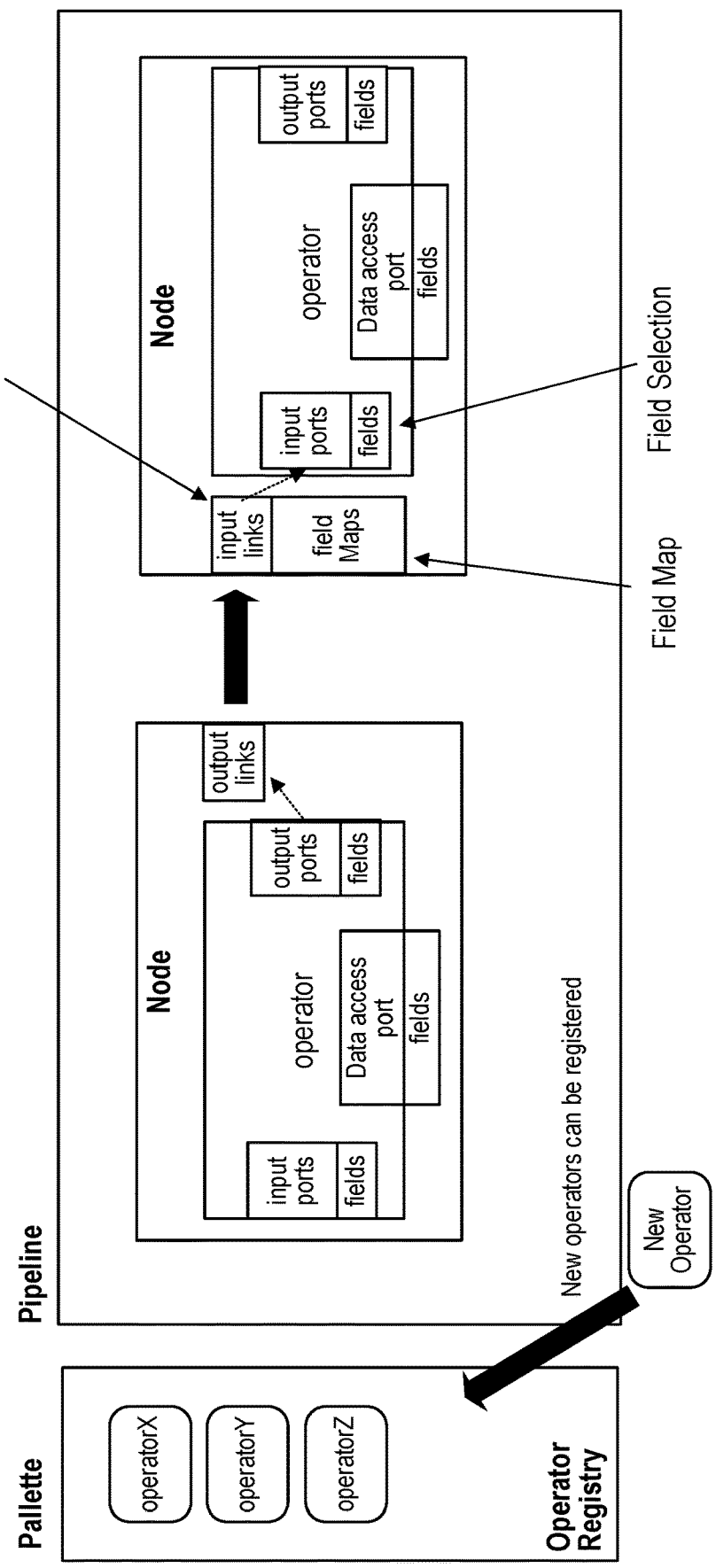
FIG. 11 is a diagram illustrating certain components and functionality of data pipelines, in accordance with certain embodiments of the present disclosure.

Referring now to FIG. 11, an example diagram is shown illustrating certain components and functionality of data pipelines in various embodiments. As shown in this example, data pipelines may include one or more independent nodes connected by communication links. Each node within a data pipeline may include an operator, input links, and output links. The node operator may correspond to the semantics of the node, for example, filter, target, etc. The operator also may have input ports, where the input ports may include input fields used to specify rules for the input fields (e.g., names, patterns, data types, etc.).

Additionally, the operator may have output ports without output fields, and a data access port with data access port fields. The input links within the node may provide the node-to-node data connectivity within the data pipeline. As shown in this example, input links may be associated with an operator input port, as well as a "from" link that connects the "from" link operator port to the current link's operator port. Further, input links may include a field map, while may be simple, composite, or rule-based. For example, a simple field map may correspond to a "source name" to "target name" field mapping, while a rule-based field map may be name-based with a filter (e.g., for name and type rules) and/or position-based. The output links of a node within a data pipeline, may be associated with an operator output port, and may have "to" links as shown in this example. Additionally, the data pipeline may have parameters that may be referenced in the pipeline, such as in filter conditions, etc.

Figure 12:
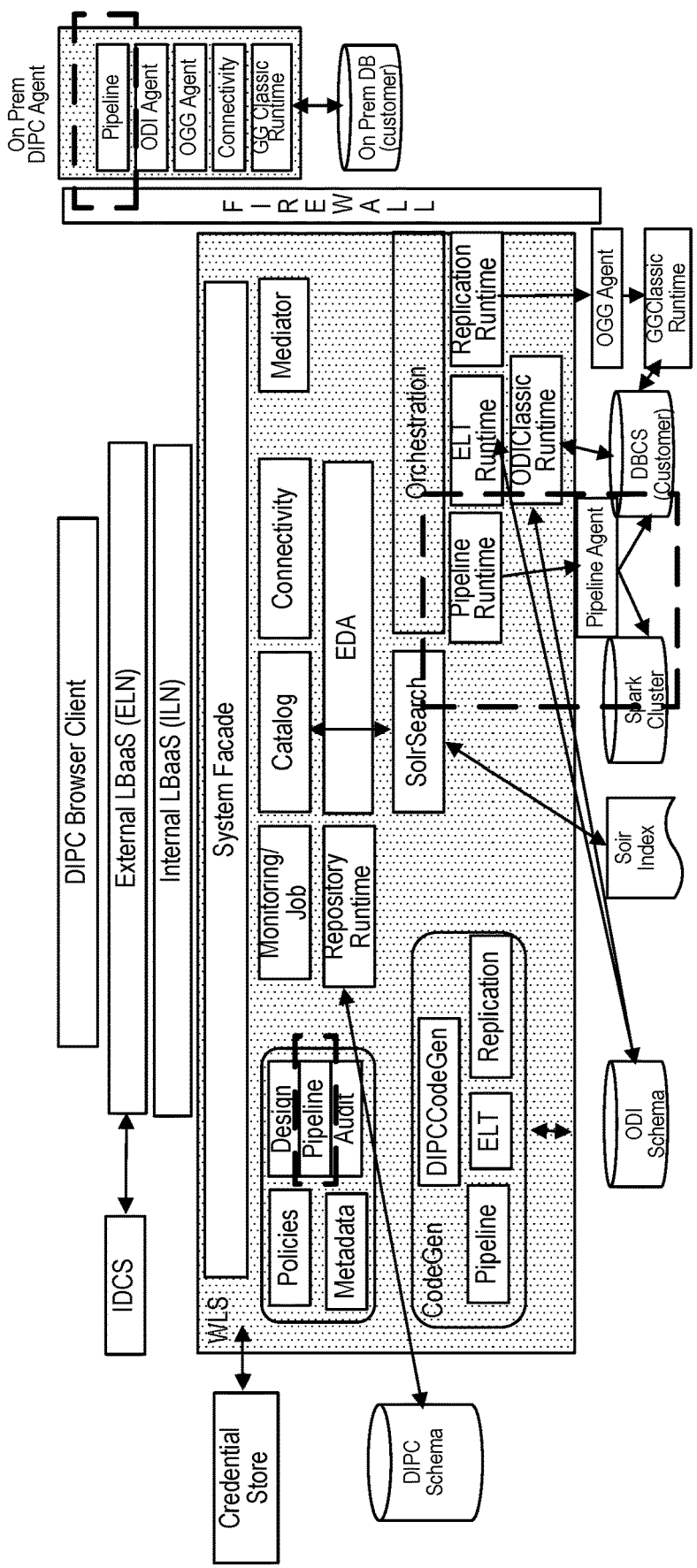
FIG. 12 is a diagram illustrating an example computing architecture including data pipelines configured to perform data integration, in accordance with certain embodiments of the present disclosure.
Figure 13:
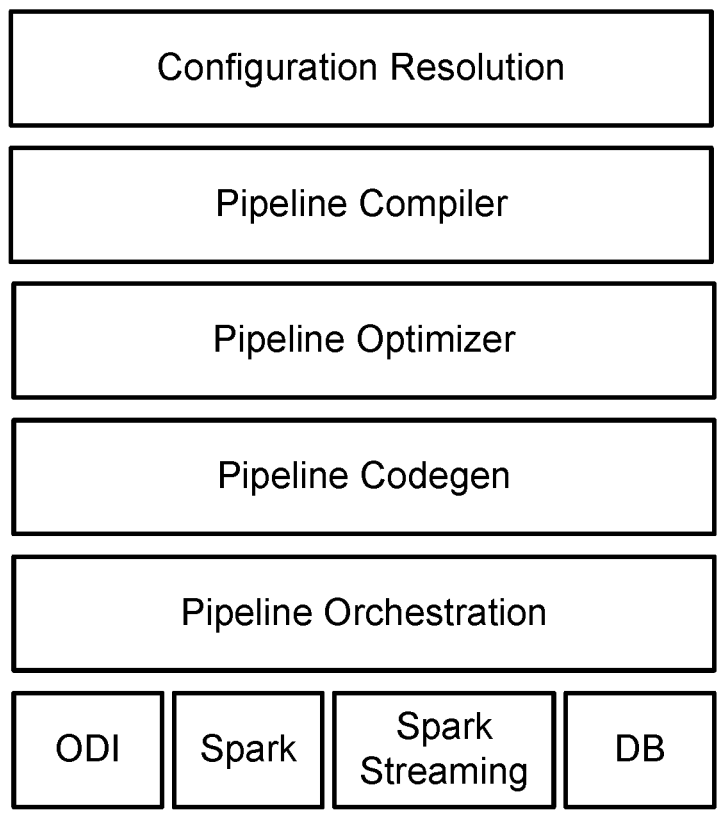
FIG. 13 is a diagram illustrating the components and functionality of an example data pipeline/data integration system, in accordance with certain embodiments of the present disclosure.
Figure 14:
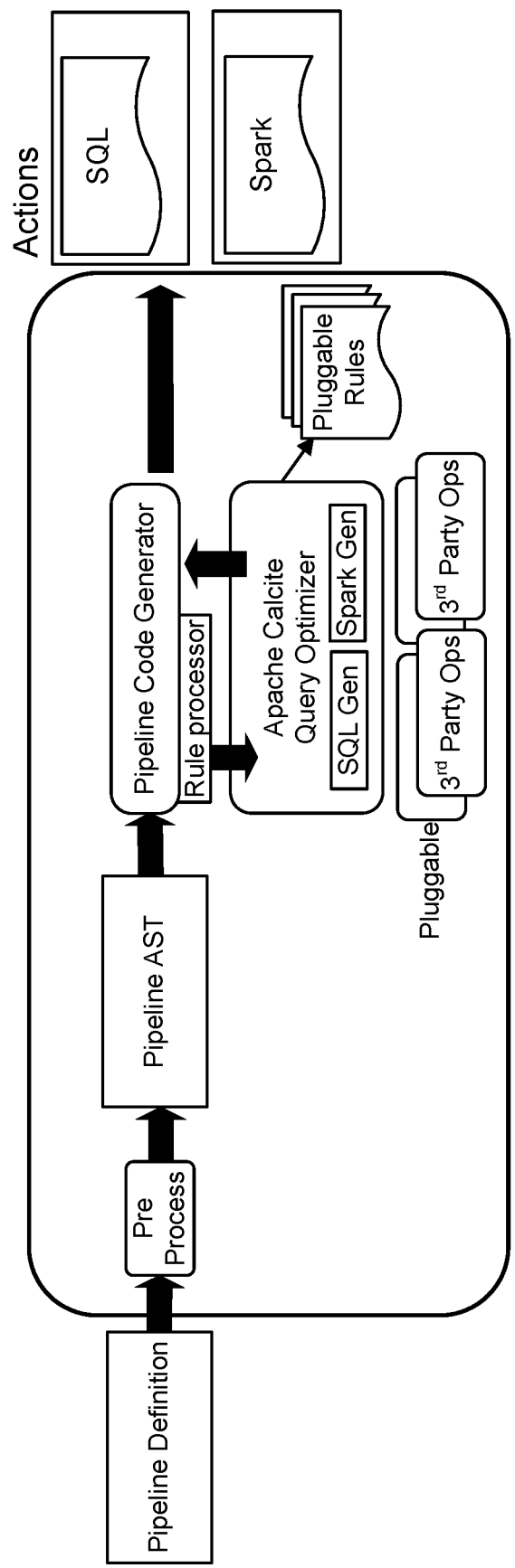
FIG. 14 is a diagram illustrating the components of a code generator within a data pipeline/data integration system, in accordance with certain embodiments of the present disclosure.

Referring now to FIG. 12, a block diagram is shown illustrating an example computing architecture including data pipelines configured to perform data integration. In FIG. 13, a diagram is shown illustrating the components/ functionality in an example pipeline. As discussed above, the data pipeline shown in FIG. 13 may include support for (1) the creation of execution tasks, in which a user may select an existing pipeline design (e.g., a pre-existing pipeline and/or a template) and then configure the pipeline as appropriate, and also support for (2) the execution of data integration tasks, in which any configuration that has been deferred may be provided. Finally, FIG. 14 is a diagram illustrating the components of the code generator within the data pipeline/data integration system.

The following section provides additional design details regarding how pipeline projection may be evaluated within the user interface and within the backend, within the data pipelines/data integration systems described above. Initially, is it noted that in some embodiments, the pipeline JAVA model may expose two separate JAVA classes that represent a dynamic set of fields. They may be called, for example, DynamicInputField and DynamicProxyField. In such examples, objects of these two class types may be used to represent a dynamic set of fields, (as opposed to a static set of fields, such as columns within a database table). To represent a dynamic set of fields, these two classes may use a concept called "Rules." These Rules may be of different types, such as NameListRule, NamePatternRule, TypedNamePatterRule, etc., and each Rule of a particular type may capture the condition(s) to be evaluated in order to resolve the actual set of fields that the rule represents. Further, each rule may contain a condition which is of type INCLUDE or EXCLUDE. In some embodiments, a DynamicField object may contain a set of rules that describe its fields.

In some embodiments, DynamicField objects may be contained inside the "Operator" objects inside an input/output port. The operator object may represent a unit of pipeline functionality, such as source/target for fetching data from external sources, Filter, Join, Expression, Aggregator, etc., for specifying how data must be manipulated as it flows through the pipeline. The DynamicInputField and DynamicProxyField classes may be simply rule-based fields in some examples, which may be treated in a similar or identical manner as static fields such as strings, integers, long, date fields, etc.

Additionally, in some embodiments, the pipeline architecture may include a rules engine component configured to process a dynamic rule-based field in order to produce a static set of fields. Various embodiments of the pipeline architecture may include one or both of two separate rules engine implementations: a user interface rules engine and a backend rules engine. One purpose of user interface rules engine may be to compute the list of fields for every rule contained in every operator. The resulting fields may be used to render a "fields" pane (see FIGS. 7A-7C) so that the user has a visual context of how fields are read from a source system, and how they flow through the pipeline nodes. Through the user interface, users may be provided the capability of configuring the set of fields (exclude, rename, etc.) that flow out from any particular node in the pipeline. This configuration may be captured as rules, and may be stored as part of a JSON definition that represents the pipeline. In contrast, a backend rules engine may be used to compute the list of fields from the rules specified in every operator, so that it may help in the code generation phase when a pipeline is executed. In some embodiments, the functionality and the behavior in the user interface rules engine and the backend rules engine may be kept identical.

As noted above, the rules engine may be used to evaluate the resulting set of fields for a particular pipeline operator. In various different embodiments, the rules engine may evaluate the resulting fields for a particular pipeline operator, by receiving a set of projection rules and a list of incoming fields to the particular operator, and then running the rules on the incoming fields. In the various embodiments described herein, the rules engine (e.g., data transformation engine 404) of a data pipeline may be implemented in accordance with the following concepts and to support the following functionality. For example, in some embodiments, the rules engine 404 may be configured so that all of the available fields coming into the operator (which may be referred to as superset of fields) may be used to evaluate the rules for that operator. Additionally or alternatively, in some embodiments, INCLUDE rules may be evaluated using all available fields (i.e., the superset) that flow into an operator. In such embodiments, EXCLUDE rules may be evaluated on the result of the previous rule execution. Further, in some cases, rule evaluation may be done in the order in which rules are specified (e.g., chained execution and processing) by the user. This order of rule evaluation is not to be confused with the logical OR/AND operations of the rules.

With respect to rule order, the rules engine 404 may provide functionality for users to specify (and/or for the rules engine 404 to automatically determine) the order of all of the INCLUDE rules and/or EXCLUDE rules within the list of rules to be executed by a particular pipeline node. In some embodiments, the architecture of a data pipeline may be configured to order "specific rules" over "generic/pattern rules." For example, if a user has two rules: INCLUDE [SPECIFIC NAME] and EXCLUDE [PATTERN N*], then the rules engine 404 may be automatically configured to prioritize the INCLUDE [SPECIFIC NAME] rule and thus may still include the NAME field, because the user has specifically included it. In various embodiments, both a front-end user interface rules engine and/or the backend rules engine may be configured to maintain the incoming order of rules, but may reorder the rules based on type to ensure that specific rule types (e.g., NameListRule type) are honored over generic rules (e.g., NamePattern, DataType, and TypedNamePattern rule types).

To illustrate these techniques, the following example demonstrates how the rules engine of a pipeline architecture may evaluate a set of rules with an incoming set of fields, to produce a resulting output set of fields, according to certain embodiments described herein. For instance, in the following example, a user has specified (e.g., via a user interface provided by the rules engine 404), that the following set of rules are to be run on a particular operator in the following order: (1) Include*(Generic rule type); (2) Exclude ABC (Specific rule type); (3) Include XYZ* (Generic rule type); (4) Include NAME (Specific rule type), (5) Exclude N* (Generic rule type), (6) Include TEST (Specific rule type). Additionally, in this example, the following illustrative list of fields may flow into the particular operator: NAME, ID, ABC, XYZABC, XYZ123, NATIONALITY, NOTATIONAL_VELOCITY, TEST_TEAM, TEST, TEST123.

In some embodiments, the rules engine 404 may be configured to re-order the rule list before the rules are run, in order to enforce certain concepts and principles of rule execution within the data pipeline (e.g. evaluating generic rules first and then specific rules). For instance, continuing the above example, the list of rules may be run and the state of the field at the conclusion of each rule evaluation is shown below. In this example, the rules engine may re-order the rule list before the rules are run, to ensure that specific rules are honored over generic rules, and thus the re-ordered list of rules may be: (1) Include*(Generic rule type); (2) Include XYZ* (Generic rule type); (3) Exclude N* (Generic rule type); (4) Exclude ABC (Specific rule type), (5) Include NAME (Specific rule type), (6) Include TEST (Specific rule type).

Continuing with the above example, the following table shows the state of each of the available fields within the example (i.e., NAME, ID, ABC, XYZABC, XYZ123, NATIONALITY, NOTATIONAL_VELOCITY, TEST_TEAM, TEST, TEST123) at the conclusion of the evaluation of each rule, in the order defined above.

TABLE 1

| Rule | Input to Rule | Output After Evaluation of Rule | Notes |
|---|---|---|---|
| Include * | NAME<br>ID<br>ABC<br>XYZABC<br>XYZ123<br>NATIONALITY<br>NOTATIONAL_VELOCITY<br>TEST_TEAM<br>TEST<br>TEST123 | NAME<br>ID<br>ABC<br>XYZABC<br>XYZ123<br>NATIONALITY<br>NOTATIONAL_VELOCITY<br>TEST_TEAM<br>TEST<br>TEST123 | Include * simply means continue with everything you have |
| Include XYZ* | NAME<br>ID<br>ABC<br>XYZABC<br>XYZ123<br>NATIONALITY<br>NOTATIONAL_VELOCITY<br>TEST_TEAM<br>TEST<br>TEST123 | NAME<br>ID<br>ABC<br>XYZABC<br>XYZ123<br>NATIONALITY<br>NOTATIONAL_VELOCITY<br>TEST_TEAM<br>TEST<br>TEST123 | This rule Includes any field that starts with XYZ. It uses the set of all available fields to perform the inclusion. This particular rule happens to be a no-op as all fields that start with XYZ are already included in the result of rule evaluation. |
| Exclude N* | NAME<br>ID<br>ABC<br>XYZABC<br>XYZ123<br>NATIONALITY<br>NOTATIONAL_VELOCITY<br>TEST_TEAM<br>TEST<br>TEST123 | ID<br>ABC<br>XYZABC<br>XYZ123<br>TEST_TEAM<br>TEST<br>TEST123 | When this rule is executed, NAME, NATIONALITY and NOTATIONAL_VELOCITY are removed from the result. Please note that the input to this rule is the output of the previous rule execution. This is because this rule is an Exclude rule. |

TABLE 1-continued

| Rule | Input to Rule | Output After Evaluation of Rule | Notes |
|---|---|---|---|
| Exclude ABC | ID<br>ABC<br>XYZABC<br>XYZ123<br>TEST_TEAM<br>TEST<br>TEST123 | ID<br>XYZABC<br>XYZ123<br>TEST_TEAM<br>TEST<br>TEST123 | As before, this rule removes the field ABC from the resulting list of fields. Again, please note that the input to this rule is the output of the previous rule because this rule is an Exclude rule. |
| Include NAME | NAME<br>ID<br>ABC<br>XYZABC<br>XYZ123<br>NATIONALITY<br>NOTATIONAL_VELOCITY<br>TEST_TEAM<br>TEST<br>TEST123 | ID<br>XYZABC<br>XYZ123<br>TEST_TEAM<br>TEST<br>TEST123<br>NAME | This rule adds the NAME field to the result list of fields. Please note that ALL AVAILABLE FIELDS are made available to this rule as input. That is how this rule is able to re-add the NAME field even though it has been removed by a previous rule. |
| Include TEST | NAME<br>ID<br>ABC<br>XYZABC<br>XYZ123<br>NATIONALITY<br>NOTATIONAL_VELOCITY<br>TEST_TEAM<br>TEST<br>TEST123 | ID<br>XYZABC<br>XYZ123<br>TEST_TEAM<br>TEST<br>TEST123<br>NAME | Again, all available fields are provided as input to this rule, but this rule is effectively a no-op because the TEST field is already part of the resulting set of fields. |

In the example above, although the rules have been re-ordered, the rules engine 404 may maintain the relative order of rules as specified (e.g., by the user). Therefore, the re-ordering of the rules may be stable, as with stable sorting algorithms. Additionally, in some cases, the above ordering principles may be reversed (or flipped) when evaluating field mapping rules. That is, when dealing with field mapping rules, specific rules may be evaluated first (thereby marking fields as mapped), and then the generic rules may be evaluated. During such processes, once a field has been marked as mapped, it need not be accessed again (e.g., it cannot be marked as unmapped again).

Figure 15:
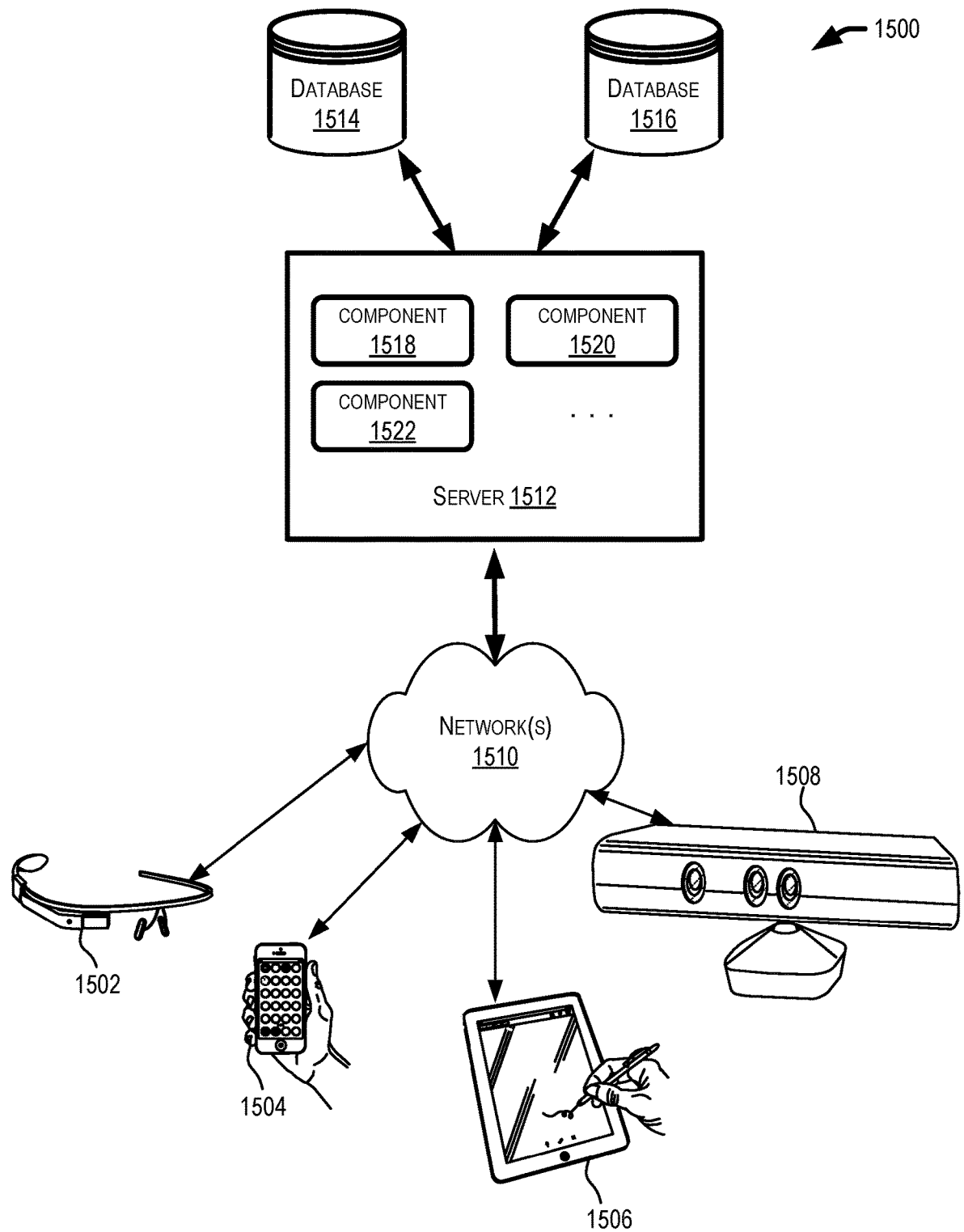
FIG. 15 depicts a simplified diagram of a distributed system for implementing certain embodiments in accordance with present disclosure.

FIG. 15 depicts a simplified diagram of a distributed system 1500 in which the various examples discussed above can be implemented. In the illustrated example, the distributed system 1500 includes one or more client computing devices 1502, 1504, 1506, 1508, coupled to a server 1512 via one or more communication networks 1510. The client computing devices 1502, 1504, 1506, 1508 may be configured to run one or more applications.

In various embodiments, server 1512 may be adapted to run one or more services or software applications that enable one or more operations associated with the data integration system. For example, users may use the client computing devices 1502, 1504, 1506, 1508 to access one or more cloud-based services.

In various examples, the server 1512 may also provide other services or software application, and can include non-virtual and virtual environments. In some examples, these services may be offered as web-based or cloud services or under a Software as a Service (SaaS) model to the users of the client computing devices 1502, 1504, 1506, 1508. Users operating the client computing devices 1502, 1504, 1506, 1508 may in turn use one or more client applications to interact with the server 1512 to use the services provided by these components.

In the configuration depicted in FIG. 15, the server 1512 may include one or more components 1518, 1520, 1522 that implement the functions performed by the server 1512. These components may include software components that may be executed by one or more processors, hardware components, or combinations thereof. It should be appreciated that various different system configurations are possible, which may be different from the example distributed system 1500.

The client computing devices 1502, 1504, 1506, 1508 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 15 depicts only four client computing devices, any number of client computing devices may be supported.

Network(s) 1510 in the distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1512 can include one or more virtual machines running virtual operating systems, or other computing architectures involving virtualization, such as one or more flexible pools of logical storage devices that can be virtualized to maintain virtual storage devices for the server. In various examples, the server 1512 may be adapted to run one or more services or software applications that perform the operations as described above.

The server 1512 may run an operating system including any of those discussed above, as well as any commercially available server operating system. The server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 1512 may include one or more applications to analyze and consolidate data feeds and/or event updates received from users of the client computing devices 1502, 1504, 1506, 1508. As an example, data feeds and/or event updates may include, but are not limited to, Twitter® feeds, Facebook® updates or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 1512 may also include one or more applications to display the data feeds and/or real-time events via one or more display devices of the client computing devices 1502, 1504, 1506, 1508.

The distributed system 1500 may also include one or more data repositories 1514, 1516. These data repositories may provide a mechanism for storing information various types of information, such as the information described by the various examples discussed above. The data repositories 1514, 1516 may reside in a variety of locations. For example, a data repository used by the server 1512 may be local to server 1512 or may be remote from server 1512 and in communication with server 1512 via a network-based or dedicated connection. The data repositories 1514, 1516 may be of different types. In some examples, a data repository used by the server 1512 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 1514, 1516 may also be used by applications to store application data. The data repositories used by applications may be of different types such as, for example, a key-value store repository, an object store repository, or a general storage repository supported by a file system.

Figure 16:
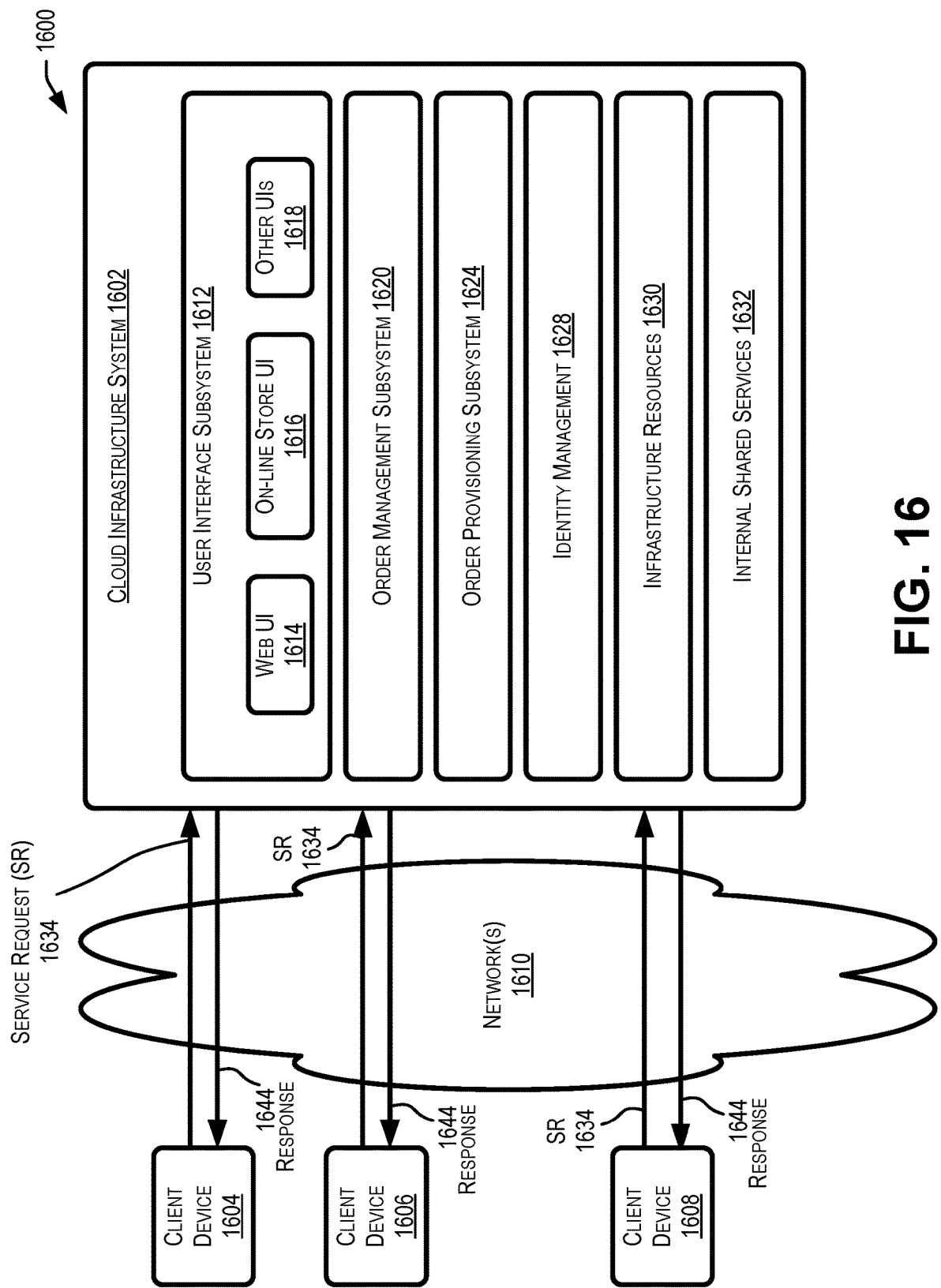
FIG. 16 is a simplified block diagram of one or more components of a system environment by which services provided by one or more components of a system may be offered as cloud services, in accordance with certain embodiments of the present disclosure.

In some examples, a cloud environment may provide one or more services such as those discussed above. FIG. 16 is a simplified block diagram of one or more components of a system environment 1600 in which these and other services can be offered as cloud services. In the example illustrated in in FIG. 16, a cloud infrastructure system 1602 may provide one or more cloud services that may be requested by users using one or more client computing devices 1604, 1606, and 1608. The cloud infrastructure system 1602 may include one or more computers and/or servers that may include those described above for server 1512 of FIG. 15. The computers in cloud infrastructure system 1602 of FIG. 16 may be organized as general purpose computers, specialized server computers, server farms, server clusters, or any other appropriate arrangement and/or combination.

Network(s) 1610 may facilitate communication and exchange of data between the clients 1604, 1606, 1608 and the cloud infrastructure system 1602. The network(s) 1610 may include one or more networks. The networks may be of the same or different types. The network(s) 1610 may support one or more communication protocols, including wired and/or wireless protocols, for facilitating the communications.

The example depicted in FIG. 16 is only one example of a cloud infrastructure system and is not intended to be limiting. It should be appreciated that, in other examples, the cloud infrastructure system 1602 may have more or fewer components than those depicted in FIG. 16, may combine two or more components, or may have a different configuration or arrangement of components. For example, although FIG. 16 depicts three client computing devices, any number of client computing devices may be supported in other examples.

The term cloud service is generally used to refer to a service that is made available to users on demand and via a communication network such as the Internet by systems (e.g., the cloud infrastructure system 1602) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In various examples, the cloud infrastructure system 1602 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 1602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 1602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 1602 may be shared by multiple users and dynamically re-allocated per demand. Additionally, resources may be allocated to users in different time zones. For example, the cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 1602 may provide the cloud services via different deployment models. In a public cloud model, the cloud infrastructure system 1602 may be owned by a third party cloud services provider and the cloud services are offered to any general public customer, where the customer can be an individual or an enterprise. In certain other embodiments, under a private cloud model, the cloud infrastructure system 1602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1602 and the services provided may be shared by several organizations in a related community. Various other models such as hybrids of the above mentioned models may also be used.

The client computing devices 1604, 1606, 1608 may be devices similar to those described above for the client computing devices 1502, 1504, 1506, 1508 of FIG. 15. The client computing devices 1604, 1606, 1608 of FIG. 16 may be configured to operate a client application such as a web browser, a proprietary client application (e.g., Oracle Forms), or some other application, which may be used by a user of the client computing device to interact with the cloud infrastructure system 1602 to use services provided by the cloud infrastructure system 1602.

In various examples, the cloud infrastructure system 1602 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 1602 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 16, cloud infrastructure system 1602 may include infrastructure resources 1630 that are used for facilitating the provision of various cloud services offered by cloud infrastructure system 1602. Infrastructure resources 1630 may include, for example, processing resources, storage or memory resources, networking resources, and the like.

In some examples, to facilitate efficient provisioning of these resources for supporting the various cloud services provided by cloud infrastructure system 1602 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 1602 may itself internally use the services 1632 that are shared by different components of cloud infrastructure system 1602 and which facilitate the provisioning of services by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 1602 may include multiple subsystems. These subsystems may be implemented in software, or hardware, or combinations thereof. As depicted in FIG. 16, the subsystems may include a user interface subsystem w that enables users or customers of cloud infrastructure system 1602 to interact with cloud infrastructure system 1602. The user interface subsystem 1612 may include various different interfaces such as a web interface 1614, an online store interface 1616 where cloud services provided by cloud infrastructure system 1602 are advertised and are purchasable by a consumer, and other interfaces 1618. For example, a customer may, using a client device, request (service request 1634) one or more services provided by cloud infrastructure system 1602 using one or more of interfaces 1614, 1616, 1618. For example, a customer may access the online store, browse cloud services offered by cloud infrastructure system 1602, and place a subscription order for one or more services offered by cloud infrastructure system 1602 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 16, the cloud infrastructure system 1602 may include an order management subsystem (OMS) 1620 that is configured to process the new order. As part of this processing, OMS 1620 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 1620 may then invoke the order provisioning subsystem (OPS) 1624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

The cloud infrastructure system 1602 may send a response or notification 1644 to the requesting customer to indicate when the requested service is now ready for use. In some instances, information (e.g., a link) may be sent to the customer that enables the customer to start using and availing the benefits of the requested services.

The cloud infrastructure system 1602 may provide services to multiple customers. For each customer, the cloud infrastructure system 1602 is responsible for managing information related to one or more subscription orders received from the customer, maintaining customer data related to the orders, and providing the requested services to the customer. The cloud infrastructure system 1602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 1602 may provide services to multiple customers in parallel. The cloud infrastructure system 1602 may store information for these customers, including possibly proprietary information. In some examples, the cloud infrastructure system 1602 includes an identity management subsystem (IMS) 1628 that is configured to manage customers information and provide the separation of the managed information such that information related to one customer is not accessible by another customer. IMS 1628 may be configured to provide various security-related services such as identity services, such as information access management, authentication and authorization services, services for managing customer identities and roles and related capabilities, and the like.

Figure 17:
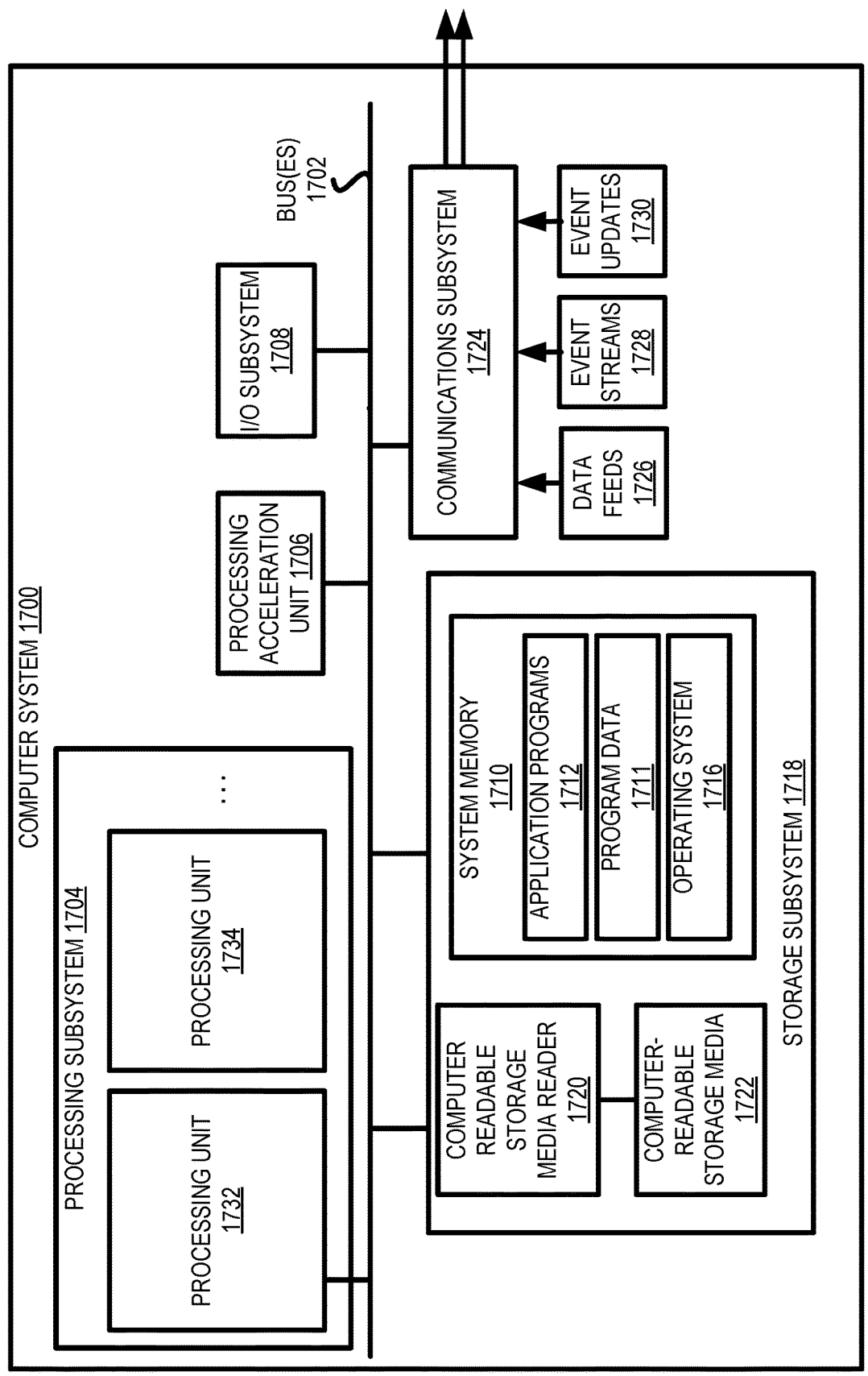
FIG. 17 illustrates an exemplary computer system, in which various embodiments of the present invention may be implemented.

FIG. 17 illustrates an example of a computer system 1700 that may be used to implement the various examples discussed above. In some examples, the computer system 1700 may be used to implement any of the various servers and computer systems described above. As shown in FIG. 17, the computer system 1700 includes various subsystems including a processing subsystem 1704 that communicates with a number of other subsystems via a bus subsystem 1702. These other subsystems may include a processing acceleration unit 1706, an I/O subsystem 1708, a storage subsystem 1718 and a communications subsystem 1724. The storage subsystem 1718 may include non-transitory computer-readable storage media 1722 and a system memory 1710.

The bus subsystem 1702 provides a mechanism for letting the various components and subsystems of the computer system 1700 communicate with each other as intended. Although the bus subsystem 1702 is shown schematically as a single bus, alternate examples of the bus subsystem may utilize multiple buses. The bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 1704 controls the operation of the computer system 1700 and may comprise one or more processors, application specific integrated circuits (ASICs), or field programmable gate arrays (FPGAs). The processors may include be single core or multi-core processors. The processing resources of computer system 1700 can be organized into one or more processing units 1732, 1734. A processing unit may include one or more processors, including single core or multi-core processors, one or more cores from the same or different processors, a combination of cores and processors, or other combinations of cores and processors. In some examples, the processing subsystem 1704 can include one or more special purpose co-processors such as graphics processors, digital signal processors (DSPs), or the like. In some examples, some or all of the processing units of the processing subsystem 1704 can be implemented using customized circuits, such as application specific integrated circuits (ASICs), or field programmable gate arrays (FPGAs).

In some examples, the processing units in the processing subsystem 1704 can execute instructions stored in the system memory 1710 or on the computer readable storage media 1722. In various examples, the processing units can execute a variety of programs or code instructions and can maintain multiple concurrently executing programs or processes. At any given time, some or all of the program code to be executed can be resident in the system memory 1710 and/or on the computer-readable storage media 1722 including potentially on one or more storage devices. Through suitable programming, the processing subsystem 1704 can provide various functionalities described above. In instances where computer system 1700 is executing one or more virtual machines, one or more processing units may be allocated to each virtual machine In some examples, a processing acceleration unit 1706 may be provided for performing customized processing or for off-loading some of the processing performed by the processing subsystem 1704 so as to accelerate the overall processing performed by the computer system 1700.

The I/O subsystem 1708 may include devices and mechanisms for inputting information to the computer system 1700 and/or for outputting information from or via the computer system 1700. In general, use of the term "input device" is intended to include all possible types of devices and mechanisms for inputting information to the computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 1700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 1718 provides a repository or data store for storing information that is used by the computer system 1700. The storage subsystem 1718 provides a tangible non-transitory computer-readable storage medium for storing the basic programming and data constructs that provide the functionality of some examples. Software (e.g., programs, code modules, instructions) that when executed by the processing subsystem 1704 provide the functionality described above may be stored in the storage subsystem 1718. The software may be executed by one or more processing units of the processing subsystem 1704. The storage subsystem 1718 may also provide a repository for storing data used in accordance with the present disclosure.

The storage subsystem 1718 may include one or more non-transitory memory devices, including volatile and non-volatile memory devices. As shown in FIG. 17, the storage subsystem 1718 includes a system memory 1710 and a computer-readable storage media 1722. The system memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 1700, such as during start-up, may typically be stored in the ROM. The RAM typically contains data and/or program modules that are presently being operated and executed by the processing subsystem 1704. In some implementations, the system memory 1710 may include multiple different types of memory, such as static random access memory (SRAM) or dynamic random access memory (DRAM), and the like.

By way of example, and not limitation, as depicted in FIG. 17, the system memory 1710 may load application programs 1712 that are being executed, which may include client applications, Web browsers, mid-tier applications, relational database management systems (RDBMS), etc., program data 1711, and an operating system 1716. By way of example, the operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 1722 may store programming and data constructs that provide the functionality of some examples. The computer-readable media 1722 may provide storage of computer-readable instructions, data structures, program modules, and other data for the computer system 1700. Software (programs, code modules, instructions) that when executed by the processing subsystem 1704 provides the functionality described above that may be stored in the storage subsystem 1718. By way of example, the computer-readable storage media 1722 may include non-volatile memory such as a hard disk drive, a magnetic disk drive, an optical disk drive such as a CD ROM, DVD, a Blu-Ray® disk, or other optical media. The computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 1722 may provide storage of computer-readable instructions, data structures, program modules, and other data for the computer system 1700.

In some examples, the storage subsystem 1718 may also include a computer-readable storage media reader 1720 that can further be connected to the computer-readable storage media 1722. The reader 1720 may receive and be configured to read data from a memory device such as a disk, a flash driver, etc.

In some examples, the computer system 1700 may support virtualization technologies, including but not limited to virtualization of processing and memory resources. For example, the computer system 1700 may provide support for executing one or more virtual machines. The computer system 1700 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 1700. Accordingly, multiple operating systems may potentially be run concurrently by the computer system 1700.

The communications subsystem 1724 provides an interface to other computer systems and networks. The communications subsystem 1724 serves as an interface for receiving data from and transmitting data to other systems from the computer system 1700. For example, the communications subsystem 1724 may enable the computer system 1700 to establish a communication channel to one or more client computing devices via the Internet for receiving and sending information from and to the client computing devices.

The communication subsystem 1724 may support both wired and/or wireless communication protocols. For example, in some examples, the communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 1724 can provide wired network connectivity (e.g., Ethernet) in addition to or instead of a wireless interface.

The communication subsystem 1724 can receive and transmit data in various forms. For example, in some examples, the communications subsystem 1724 may receive input communication in the form of structured and/or unstructured data feeds 1726, event streams 1728, event updates 1730, and the like. For example, the communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

The communications subsystem 1724 may also be configured to output the structured and/or unstructured data feeds 1726, event streams 1728, event updates 1730, and the like to one or more databases that may be in communication with one or more streaming data source computers coupled to the computer system 1700.

The computer system 1700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various examples.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the disclosure. Thus, although specific implementations have been described, these are not intended to be limiting; various modifications and equivalents are within the scope of the disclosure.

What is claimed is:

1. A method of transforming data within a data pipeline comprising one or more data processing nodes, the method comprising:
   receiving, by a first processing node within a data pipeline, a first data set from a source system, wherein the first processing node comprises an intermediate node between the source system and one or more target systems in the data pipeline, and the first processing node performs data transformations on the first data set as the first data set passes through the first processing node between the source system and the one or more target systems;
   wherein the first processing node is one of a plurality of processing nodes within the data pipeline, and wherein each of the plurality of processing nodes within the data pipeline stores and uses a different set of pipeline flow rules to transform data transmitted between the source system and the one or more target systems;
   detecting, by the first processing node, a change in a source database schema for the source system, wherein the first processing node detects the change in a source database schema by analyzing characteristics of the first data set;
   updating, by the first processing node, one or more pipeline flow rules associated with the data pipeline, wherein the one or more pipeline flow rules are updated based on the change in a source database schema;
   determining, by the first processing node, one or more data transformation rules, wherein the data transformation rules are determined using the retrieved pipeline flow rules;
   transforming, by the first processing node, the received first data set into a second data set using the data transformation rules; and
   transmitting, by the first processing node, the transformed second data set to one or more target systems.

2. The method of claim 1, wherein the one or more data transformation rules are generated by the first processing node after the first processing node receives the first data set from the source system.

3. The method of claim 1, further comprising:
   receiving, by the first processing node, one or more updates to the one or more pipeline flow rules; and
   in response to the receiving the updates to the one or more pipeline flow rules:
      (a) requesting and receiving, from the source system, an updated first data set corresponding to the first data set;
      (b) determining updated data transformation rules, based on the updated pipeline flow rules;
      (c) transforming the updated first data set into an updated second data set, using the updated data transformation rules; and
      (d) transmitting the updated second data set to the one or more target systems.

4. The method of claim 1, further comprising:
   receiving, by the first processing node, a third data set from the source system, wherein the third data set is received from the source system after the first data set;
   determining, by the first processing node, that the source database schema of the source system has been changed to an updated source database schema, at a time between when the first data set was transmitted by the source system and when the third data set was transmitted by the source system; and
   in response to determining that the source database schema of the source system has been changed to the updated source database schema, generating, by the first processing node, one or more updated data transformation rules, wherein the updated data transformation rules are determined using the retrieved pipeline flow rules and are based on the updated source database schema.

5. The method of claim 4, wherein determining that the source database schema of the source system has been changed to the updated source database schema comprises at least one of:
   determining that, for a source database within the source system from which the first data set and third data set were generated, one or more tables, views, procedures, queues, or triggers within the source database were created, deleted, or modified;
   determining that a data type or size of a data field within the source database has been changed; or
   determining that a relationship between multiple data fields in the source database has been changed.

6. The method of claim 4, wherein determining that the source database schema of the source system has been changed to the updated source database schema comprises:
   analyzing, by the first processing node, one or more characteristics of the first data set received from the source system;
   analyzing, by the first processing node, one or more corresponding characteristics of the third data set received from the source system; and
   comparing, by the first processing node, the characteristics of the first data set and the corresponding characteristics of the third data set.

7. The method of claim 4, further comprising:
   determining a first set of database objects within the source system that were directly modified with the change to the updated source database schema;

determining a second set of database objects within the source system that were indirectly affected by the change to the updated source database schema; and determining and executing a subset of the pipeline flow rules that are based on the first set of database objects and the second set of database objects.

8. A computer system, comprising: a processing unit comprising one or more processors; and a non-transitory computer-readable medium containing instructions that, when executed by the one or more processors, cause the one or more processors to perform operations comprising:

receiving, by a first processing node within a data pipeline, a first data set from a source system, wherein the first processing node comprises an intermediate node between the source system and one or more target systems in the data pipeline, and the first processing node performs data transformations on the first data set as the first data set passes through the first processing node between the source system and the one or more target systems;

wherein the first processing node is one of a plurality of processing nodes within the data pipeline, and wherein each of the plurality of processing nodes within the data pipeline stores and uses a different set of pipeline flow rules to transform data transmitted between the source system and the one or more target systems;

detecting, by the first processing node, a change in a source database schema for the source system, wherein the first processing node detects the change in a source database schema by analyzing characteristics of the first data set;

updating, by the first processing node, one or more pipeline flow rules associated with the data pipeline, wherein the one or more pipeline flow rules are updated based on the change in a source database schema;

determining, by the first processing node, one or more data transformation rules, wherein the data transformation rules are determined using the retrieved pipeline flow rules; transforming, by the first processing node, the received first data set into a second data set using the data transformation rules; and transmitting, by the first processing node, the transformed second data set to one or more target systems.

9. The computer system of claim 8, wherein the one or more data transformation rules are generated after receives the first data set from the source system.

10. The computer system of claim 8, wherein the operations further comprise:

receiving one or more updates to the one or more pipeline flow rules; and in response to the receiving the updates to the one or more pipeline flow rules:
(a) requesting and receiving, from the source system, an updated first data set corresponding to the first data set;
(b) determining updated data transformation rules, based on the updated pipeline flow rules;
(c) transforming the updated first data set into an updated second data set, using the updated data transformation rules; and
(d) transmitting the updated second data set to the one or more target systems.

11. The computer system of claim 8, wherein the operations further comprise:

receiving a third data set from the source system, wherein the third data set is received from the source system after the first data set;

determining that the source database schema of the source system has been changed to an updated source database schema, at a time between when the first data set was transmitted by the source system and when the third data set was transmitted by the source system; and in response to determining that the source database schema of the source system has been changed to the updated source database schema, generating one or more updated data transformation rules, wherein the updated data transformation rules are determined using the retrieved pipeline flow rules and are based on the updated source database schema.

12. The computer system of claim 11, wherein determining that the source database schema of the source system has been changed to the updated source database schema comprises at least one of:

determining that, for a source database within the source system from which the first data set and third data set were generated, one or more tables, views, procedures, queues, or triggers within the source database were created, deleted, or modified;

determining that a data type or size of a data field within the source database has been changed; or determining that a relationship between multiple data fields in the source database has been changed.

13. The computer system of claim 11, wherein determining that the source database schema of the source system has been changed to the updated source database schema comprises:

analyzing one or more characteristics of the first data set received from the source system;

analyzing one or more corresponding characteristics of the third data set received from the source system; and comparing the characteristics of the first data set and the corresponding characteristics of the third data set.

14. The computer system of claim 11, the instructions causing the one or more processors to perform further operations including:

determining a first set of database objects within the source system that were directly modified with the change to the updated source database schema;

determining a second set of database objects within the source system that were indirectly affected by the change to the updated source database schema; and determining and executing a subset of the pipeline flow rules that are based on the first set of database objects and the second set of database objects.

15. A non-transitory computer-readable storage medium storing computer-executable instructions that, when executed by one or more processors of a computing device, cause the one or more processors to perform operations comprising:

receiving, by a first processing node within a data pipeline, a first data set from a source system, wherein the first processing node comprises an intermediate node between the source system and one or more target systems in the data pipeline, and the first processing node performs data transformations on the first data set as the first data set passes through the first processing node between the source system and the one or more target systems;

wherein the first processing node is one of a plurality of processing nodes within the data pipeline, and wherein each of the plurality of processing nodes within the data pipeline stores and uses a different set of pipeline flow rules to transform data transmitted between the source system and the one or more target systems;

detecting, by the first processing node, a change in a source database schema for the source system, wherein the first processing node detects the change in a source database schema by analyzing characteristics of the first data set;

updating, by the first processing node, one or more pipeline flow rules associated with the data pipeline, wherein the one or more pipeline flow rules are updated based on the change in a source database schema;

determining, by the first processing node, one or more data transformation rules, wherein the data transformation rules are determined using the retrieved pipeline flow rules;

transforming, by the first processing node, the received first data set into a second data set using the data transformation rules; and the transformed second data set to one or more target systems.

16. The non-transitory computer-readable storage medium of claim 15, wherein analyzing the characteristics of the first data set comprises:
comparing, by the first processing node, characteristics of the first data set with characteristics of a previous data set from the source system that was previously transformed by the first processing node.

17. The non-transitory computer-readable storage medium of claim 15, wherein analyzing the characteristics of the first data set comprises:
retrieving, by the first processing node, model information for the source system and comparing the model information to a prior snapshot of the model information for the source system.

18. The non-transitory computer-readable storage medium of claim 15, wherein the operations further comprise:
identifying objects in the first data set that are changed or affected by the change in the source database schema.

* * * * *